United States Patent
Tsujimoto et al.

(10) Patent No.: US 8,925,303 B2
(45) Date of Patent: Jan. 6, 2015

(54) EXHAUST GAS CONTROL DEVICE OF INTERNAL COMBUSTION ENGINE

(75) Inventors: Kenichi Tsujimoto, Mishima (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 610 days.

(21) Appl. No.: 13/059,905

(22) PCT Filed: Jan. 13, 2010

(86) PCT No.: PCT/IB2010/000057
§ 371 (c)(1),
(2), (4) Date: Feb. 18, 2011

(87) PCT Pub. No.: WO2010/082118
PCT Pub. Date: Jul. 22, 2010

(65) Prior Publication Data
US 2011/0258990 A1    Oct. 27, 2011

(30) Foreign Application Priority Data
Jan. 15, 2009  (JP) .................................. 2009-006995

(51) Int. Cl.
*F01N 3/00*    (2006.01)
*F01N 3/10*    (2006.01)
*F01N 3/20*    (2006.01)
*F01N 3/025*   (2006.01)
*F01N 3/08*    (2006.01)
*F01N 9/00*    (2006.01)

(52) U.S. Cl.
CPC ............ *F01N 3/2033* (2013.01); *F01N 3/0256* (2013.01); *F01N 3/0842* (2013.01); *F01N 3/085* (2013.01); *F01N 3/0871* (2013.01); *F01N 3/208* (2013.01); *F01N 9/00* (2013.01); *F01N 2240/14* (2013.01); *F01N 2610/02* (2013.01); *F01N 2610/03* (2013.01); *F01N 2610/107* (2013.01); *Y02T 10/26* (2013.01); *Y02T 10/47* (2013.01); *Y02T 10/24* (2013.01)
USPC .............................................. 60/286; 60/300

(58) Field of Classification Search
CPC ............ F01N 2240/14; F01N 2610/02; F01N 2610/03; F01N 2610/107; F01N 3/025; F01N 3/0256; F01N 3/2033
USPC ........................................... 60/274, 286, 300
See application file for complete search history.

(56) References Cited

U.S. PATENT DOCUMENTS

2005/0112046 A1 * 5/2005 Nagaoka et al. ........... 423/239.1
2007/0044453 A1 * 3/2007 Strauser et al. ................. 60/286

(Continued)

FOREIGN PATENT DOCUMENTS

DE    41 32 814 A1    4/1993
DE    43 07 525 A1    9/1994

(Continued)

OTHER PUBLICATIONS

Japanese Office Action issued in Application No. 2009-006995; Dated Oct. 26, 2010 (With Translation).

(Continued)

*Primary Examiner* — Kenneth Bomberg
*Assistant Examiner* — Jason Sheppard
(74) *Attorney, Agent, or Firm* — Oliff PLC

(57) ABSTRACT

An exhaust gas control device of an internal combustion engine has an exhaust treatment device that purifies an exhaust gas. The exhaust gas control device is formed such that unburned fuel is supplied into the exhaust gas by a fuel addition valve, and the unburned fuel is ignited by a glow plug, to generate thereby a flame that reaches an upstream end of an exhaust treatment device. The unburned fuel is caused to become adhered to the upstream end of the exhaust treatment device before a generated flame reaches the exhaust treatment device. Then, the unburned fuel adhered to the upstream end of the exhaust treatment device burns by the flame.

27 Claims, 15 Drawing Sheets

(56) References Cited

U.S. PATENT DOCUMENTS

2008/0163612 A1* 7/2008 Gaiser .............................. 60/299
2009/0000605 A1* 1/2009 Craig et al. ................... 123/549

FOREIGN PATENT DOCUMENTS

| DE | 10 2005 039 630 A1 | 3/2007 |
| EP | 1 529 933 A1 | 5/2005 |
| EP | 1 939 419 A1 | 7/2008 |
| JP | U-61-128324 | 8/1986 |
| JP | A-08-509044 | 9/1996 |
| JP | A-11-324648 | 11/1999 |
| JP | A-2000-514911 | 11/2000 |
| JP | A-2007-146700 | 6/2007 |
| JP | A-2007-146784 | 6/2007 |

OTHER PUBLICATIONS

Written Opinion of the International Searching Authority issued in Application No. PCT/IB2010/000057; Dated Apr. 1, 2010.
International Search Report issued in Application No. PCT/IB2010/000057; Dated Apr. 1, 2010.

* cited by examiner

FIG.1
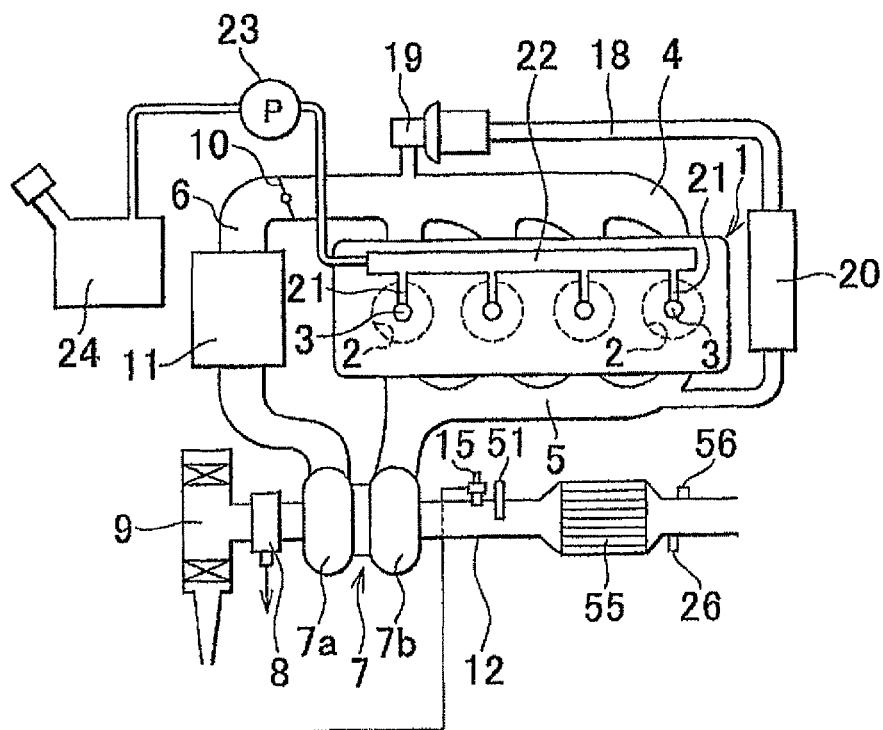
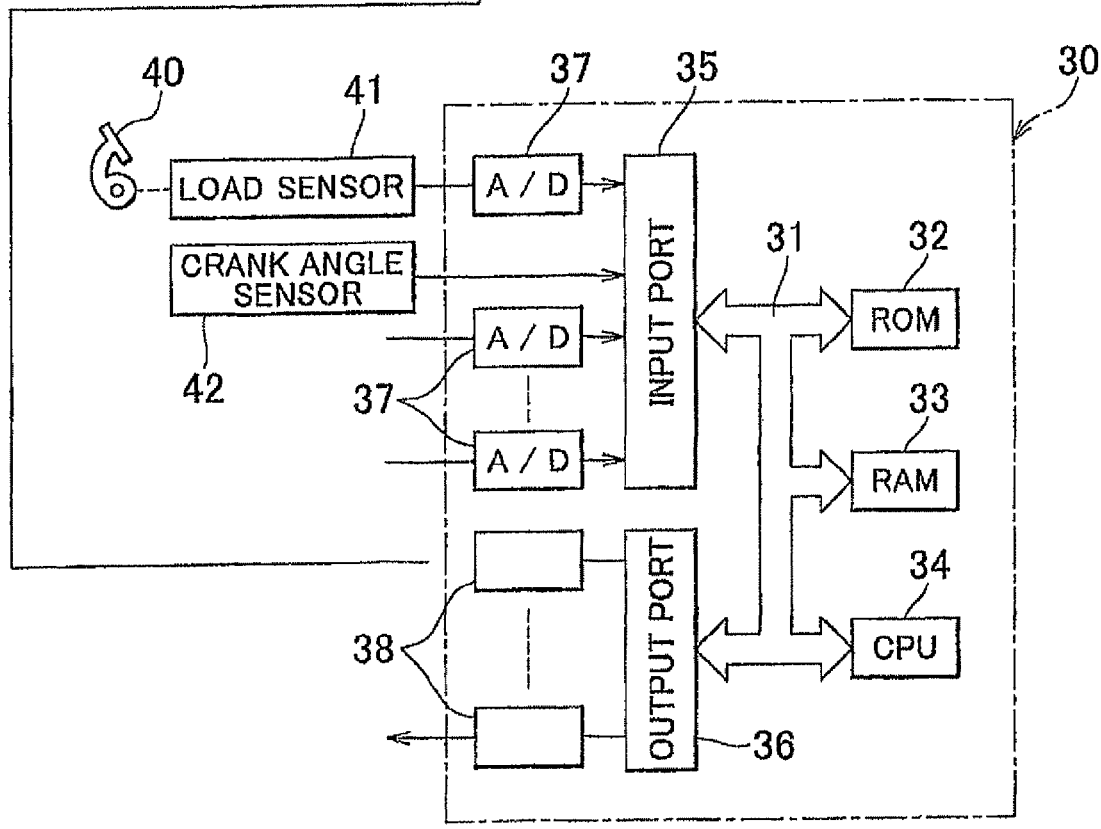

EXHAUST GAS CONTROL DEVICE OF INTERNAL COMBUSTION ENGINE

BACKGROUND OF THE INVENTION

1. Field of the Invention

The invention relates to an exhaust gas control device of an internal combustion engine.

2. Description of the Related Art

Exhaust gas in internal combustion engines such as diesel or gasoline engines contains, for instance, components such as carbon monoxide (CO), unburned fuel (HC), nitrogen oxides ($NO_x$) and particulate matter (PM: particulates).

An exhaust treatment device is mounted in the internal combustion engine in order to purify these components. The exhaust treatment device has, for instance, an oxidation catalyst for oxidizing CO and the like, a $NO_x$ storage catalyst or $NO_x$ selective reducing catalyst for removing nitrogen oxides, and an particulate filter for removing particulate matter.

Generation of flame in the exhaust purification device of an internal combustion engine is a conventional feature. Published Japanese Translation of PCT Application No. 8-509044 (JP-A-8-509044) discloses a device that includes a fuel supply body, and a fuel line which is provided in the gas discharge line of exhaust gas of the engine and which supplies fuel that ignites at a low temperature. The device has also an air pump that supplies combustion air, via an air line, into the gas line of the exhaust gas. Particulate pollutants in the exhaust gas stream are burned off in an exhaust gas pipe upstream of a particle filter for removing particulate pollutants.

Published Japanese Translation of PCT Application No. 2000-514911 (JP-A-2000-514911) discloses a combustion chamber that has a first catalytic reactor and a second catalytic reactor disposed in series with the first catalytic reactor. The first catalytic reactor is heated to or above ignition temperature. Thereafter, a fuel and air mixture is infused into the first catalytic reactor. Catalytic combustion begins thereby in the first catalytic reactor. The flow rate of air-fuel (A/F) mixture is increased after ignition at the first catalytic reactor, and catalytic combustion moves onto the second catalytic reactor, as a result of which there is heated a heat exchanger for heating that is disposed downstream of the second catalytic reactor.

The temperature of the exhaust treatment device can be raised in a short time through generation of flame upstream of the exhaust treatment device. The temperature of the exhaust gas is raised through flame generation, so that the temperature of the exhaust treatment device can be raised by way of the resulting high-temperature exhaust gas. For instance, the temperature of an oxidation catalyst can be raised to the activation temperature, in a short time, through flame generation upstream of the oxidation catalyst.

To generate flame in an exhaust passage, the flame can be generated, for instance, by heating unburned fuel that is supplied into the exhaust pipe. Flame generation upstream of the exhaust treatment device allows the temperature of the exhaust gas to be raised and allows also reforming the combusting fuel. For instance, flame generation allows reforming heavy unburned fuel into light unburned fuel. A light reducing agent having excellent reducing power can be supplied thereby when it is necessary to supply a reducing agent into the exhaust treatment device.

Flame generated through fuel combustion gives rise to highly reactive substances (active substances) within the flame. These substances include, for instance, radicals and intermediate products. These active substances have strong oxidizing or reducing power, and are therefore appropriate for oxidation reactions and reduction reactions in the exhaust treatment device. The active substances in the flame, however, are unstable, and turn at once into stable final products outside the flame. Flame-generated active substances have been overlooked in the related art, and have not been sufficiently exploited.

SUMMARY OF THE INVENTION

The invention provides an exhaust gas control device of an internal combustion engine, the exhaust gas control device having an exhaust treatment device in which reactivity is enhanced.

In one aspect of the invention, the exhaust gas control device of an internal combustion engine is provided with an exhaust treatment device that is disposed in an exhaust passage and that purifies an exhaust gas; a flame generating unit that generates a flame through ignition of unburned fuel contained in the exhaust gas, and that causes a generated flame to reach an upstream end of the exhaust treatment device; and a control unit that controls the flame generating unit. The control unit is configured so as to execute control to cause the unburned fuel to become adhered to the upstream end of the exhaust treatment device, before the flame generated by the flame generating unit reaches the exhaust treatment device, and to cause the unburned fuel adhered to the upstream end of the exhaust treatment device to burn by the flame. Such a configuration allows enhancing reactivity in the exhaust treatment device.

In the above aspect, the flame generating unit may have a glow plug and a fuel supply unit that supplies the unburned fuel into upstream of the exhaust passage above the glow plug. In order to cause the unburned fuel to become adhered to the upstream end of the exhaust treatment device, the control unit may be configured so as to execute control to cause the fuel supply unit to supply the unburned fuel before a temperature of the glow plug reaches an ignition temperature of the unburned fuel through energization of the glow plug.

In the above aspect, the flame generating unit may have a glow plug, and a fuel supply unit that supplies the unburned fuel into upstream of the exhaust passage above the glow plug. In order to cause the unburned fuel to become adhered to the upstream end of the exhaust treatment device, the control unit may be configured so as to execute control to cause the fuel supply unit to supply the unburned fuel in an amount greater than a minimum amount required for generating the flame, after a temperature of the glow plug reaches an ignition temperature of the unburned fuel through energization of the glow plug.

In the above aspect, the control unit may be configured so as to execute control to generate the flame intermittently a plurality of times. Such a configuration allows suppressing slip-through of unburned fuel past the exhaust treatment device.

In the above aspect, the control unit may be configured so as to execute control to reduce an amount of the unburned fuel adhered to the exhaust treatment device upon any of a second and subsequent flame generations, from among the plurality of flame generations, with respect to the amount of the unburned fuel adhered to the exhaust treatment device upon a first flame generation. Such a configuration allows reducing fuel consumption during flame generation.

In the above aspect, the control unit may be configured so as to execute control to prolong duration of any of a second and subsequent flame generations, from among the plurality of flame generations, with respect to duration of a first flame generation. Such a configuration allows carrying out, the intended treatment in the exhaust treatment device in a short time.

In the above aspect, the control unit may be configured so as to execute control to raise a temperature of the flame upon any of a second and subsequent flame generations, from among the plurality of flame generations, with respect to the temperature of the flame, upon a first flame generation. Such a configuration allows carrying out the intended treatment in the exhaust treatment device in a short time.

In the above aspect, the exhaust treatment device may have an oxidation catalyst that adsorbs the unburned fuel, and a first temperature sensor that detects a temperature of the oxidation catalyst. The control unit may be configured so as to execute control to reduce an adsorption amount of the unburned fuel as a detected temperature of the oxidation catalyst increases. Such a configuration allows preventing the supplied unburned fuel from getting through the oxidation catalyst without becoming adhered thereto.

In the above aspect, the exhaust treatment device may have an oxidation catalyst that adsorbs the unburned fuel. The exhaust gas control device may include an adhesion amount detection unit that detects an amount of the unburned fuel adhered to the oxidation catalyst. The control unit may be configured so as to execute control to lower a temperature of the flame as the amount of the unburned fuel adhered to the oxidation catalyst increases. Such a configuration allows preventing unburned fuel from desorbing in significant amounts, accompanying flame generation, and from being discharged out of the oxidation catalyst.

In the above aspect, the exhaust treatment device may have a $NO_x$ storage catalyst. When an air-fuel ratio of the exhaust gas flowing into the $NO_x$ storage catalyst is lean, the $NO_x$ storage catalyst may store $NO_x$ contained in the exhaust gas, and may release stored $NO_x$ when the air-fuel ratio is a stoichiometric air-fuel ratio or a rich air-fuel ratio, and the $NO_x$ storage catalyst stores $SO_x$ along with $NO_x$ upon storage of $NO_x$, and releases stored $SO_x$ when a temperature of the $NO_x$ storage catalyst rises to a temperature at which the $SO_x$ is released and when the, air-fuel ratio becomes the stoichiometric air-fuel ratio or the rich air-fuel ratio. The control unit may be configured so as to execute control to cause the flame generating unit to generate the flame, and to enrich the air-fuel ratio, when performing $NO_x$ release control for release of the $NO_x$ from the $NO_x$ storage catalyst or $SO_x$ release control for release of the $SO_x$ from the $NO_x$ storage catalyst. Such a configuration allows enriching significantly the air-fuel ratio of the exhaust gas.

In the above aspect, the control unit may be configured so as to execute control to intermittently enrich the air-fuel ratio when performing the $NO_x$ release control or the $SO_x$ release control. Such a configuration allows enriching significantly the air-fuel ratio of the exhaust gas while suppressing slip-through of the unburned fuel.

In the above aspect, the control unit may be configured so as to execute control to increase oxygen concentration in the exhaust gas that is supplied to the flame generating unit, before generation of the flame or during a period in which the flame is generated, when performing $NO_x$ release control or $SO_x$ release control. Such a configuration allows increasing the amount of active substance.

In the above aspect, the control unit may be configured so as to execute control to reduce oxygen concentration in the exhaust gas that is supplied to the flame generating unit, before generation of the flame or during a period in which the flame is generated, when performing $NO_x$ release control or $SO_x$ release control. The above configuration allows supplying a suitable reducing agent, having a low oxygen concentration, to the $NO_x$ storage catalyst.

In the above aspect, the control unit may be configured so as to execute control to reduce a flow rate of the exhaust gas, during a period in which the flame is generated or after generation of the flame, when performing $NO_x$ release control or $SO_x$ release control. Such a configuration allows prolonging the reaction time of the active substance in the $NO_x$ storage catalyst.

In the above aspect, the control unit may be configured so as to execute control to increase an amount of the unburned fuel that is supplied by the fuel supply unit during a period in which the flame is generated. Such a configuration allows increasing the reaction amount in the $NO_x$ storage catalyst.

The exhaust gas control device of the internal combustion engine in the above aspect may further have an active substance detection unit that detects an amount of an active substance that is generated by the flame. The control unit may be configured so as to execute control to increase a number of times in which the flame is generated, when the amount of the active substance detected by the active substance detection unit is equal to or less thin a criterion value, as compared with the number of times when the amount of the active substance detected by the active substance detection unit is greater than the criterion value. Such a configuration allows generating an optimal flame in accordance with the amount of active substance.

In the above aspect, the control unit may be configured so as to execute control to make the air-fuel ratio leaner and increase a flow rate of the exhaust gas after the $NO_x$ release control or the $SO_x$ release control, as compared with the air-fuel ratio and the flow rate of the exhaust gas when the $NO_x$ release control or the $SO_x$ release control is executed. Such a configuration allows removing residual carbon monoxide or the like from the interior of the $NO_x$ storage catalyst.

In the above aspect, the $NO_x$ storage catalyst may have an active $SO_x$ release temperature at which the $SO_x$ is released by an active substance when the flame reaches the $NO_x$ storage catalyst. The control unit may be configured so as to execute control to, during the $NO_x$ release control, raise a temperature at an upstream end of the $NO_x$ storage catalyst to the temperature equal to or higher than the active $SO_x$ release temperature.

In the above aspect, the exhaust treatment device may have a $SO_x$ adsorption catalyst that traps the $SO_x$. The $SO_x$ adsorption catalyst may be disposed downstream of the $NO_x$ storage catalyst in the exhaust passage. Such a configuration allows suppressing sudden release of a significant amount of $SO_x$ into the atmosphere.

The exhaust gas control device of the internal combustion engine in the above aspect may further have a second temperature sensor that detects a temperature of the $SO_x$ adsorption catalyst. The control unit may be configured so as to execute control to restrict generation of the flame when a detected temperature of the $SO_x$ adsorption catalyst is lower than a criterion value. Such a configuration allows preventing $SO_x$ from getting through the $SO_x$ adsorption catalyst.

The exhaust gas control device of the internal combustion engine in the above aspect may further have a reducing agent supply unit that supplies urea or ammonia to the exhaust passage. The exhaust treatment device may have an oxidation catalyst, and a $NO_x$ selective reducing catalyst that is disposed downstream of the oxidation catalyst and that selectively reduces $NO_x$ contained in the exhaust gas by means of the ammonia. In this case, the reducing agent supply unit may be disposed upstream of the $NO_x$ selective reducing catalyst, and the control unit may be configured so as to execute control to replenish the ammonia that is adsorbed to the $NO_x$ selective reducing catalyst and that is consumed during a period in which the flame is generated, by causing the reducing agent supply unit to supply the urea or the ammonia.

In the above aspect, the control unit may be configured so as to execute control to cause the reducing agent supply unit to supply the urea or the ammonia such that an amount of the ammonia adsorbed to the $NO_x$ selective reducing catalyst becomes equal to or greater than a predetermined amount, before generation of the flame or after the generation of the flame. Such a configuration allows avoiding reformation of the urea or ammonia on account of contact with the flame.

The exhaust gas control device of the internal combustion engine in the above aspect may further have a poisoning detection unit that detects a HC poisoning amount of the $NO_x$ selective reducing catalyst. The control unit may be configured so as to execute control to cause the flame generating unit to generate the flame when the HC poisoning amount detected by the poisoning detection unit is equal to or greater than a criterion value. The above configuration makes for easy HC poisoning regeneration.

In the above aspect, the exhaust treatment device may have a particulate filter that traps particulate matter in the exhaust gas. The control unit may be configured so as to execute control to generate the flame upon removal of the particulate matter from the particulate filter through burning of the particulate matter by raising a temperature of the exhaust gas. Such a configuration allows regeneration of the particulate filter to be carried out at a lower temperature than when no flame is generated.

The exhaust gas control device of the internal combustion engine in the above aspect may further have a reducing agent supply unit that supplies urea to a $NO_x$ selective reducing catalyst; and a poisoning detection unit that detects a HC poisoning amount of the $NO_x$ selective reducing catalyst. The exhaust treatment device may have an oxidation catalyst or a particulate filter that traps particulate matter in the exhaust gas, and the $NO_x$ selective reducing catalyst that is disposed downstream of the particulate filter or of the oxidation catalyst and that selectively reduces $NO_x$ contained in the exhaust gas by means of ammonia generated from the urea. The control unit may be configured so as to execute control to generate the flame when the HC poisoning amount detected by the poisoning detection unit is equal to or greater than a criterion value, and to supply the urea in a smaller supply amount than when the HC poisoning amount is smaller than the criterion value. Such a configuration allows preventing $NO_x$ from getting through the $NO_x$ selective reducing catalyst.

The exhaust gas control device of the internal combustion engine in the above aspect may further have a flame state determination unit that determines whether the flame is generated or not. The control unit may be configured so as to execute flame generation control when the flame is generated and flame non-generation control when the flame is not generated. The control unit may be configured so as to select either of the flame generation control and the flame non-generation control on the basis of a determination, by the flame state determination unit, of whether the flame is generated or not. Such a configuration allows performing optimal control in accordance with flame generation or flame non-generation.

The exhaust gas control device of the internal combustion engine in the above aspect may further have a deposition amount detection unit that detects an amount of soot deposited on at least one of the flame generating unit and the exhaust treatment device. The control unit may be configured so as to execute control to generate the flame when a soot deposition amount detected by the deposition amount detection unit exceeds an allowable value. Such a configuration allows easily removing soot that is deposited at various sites.

The exhaust gas control device of the internal combustion engine according to the above aspect of the invention allows providing an exhaust gas control device of an internal combustion engine in which reactivity in an exhaust treatment device is enhanced.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 1 is a schematic diagram of an exhaust purification device of an internal combustion engine in Embodiment 1;

DETAILED DESCRIPTION OF EMBODIMENTS

Figure 2:
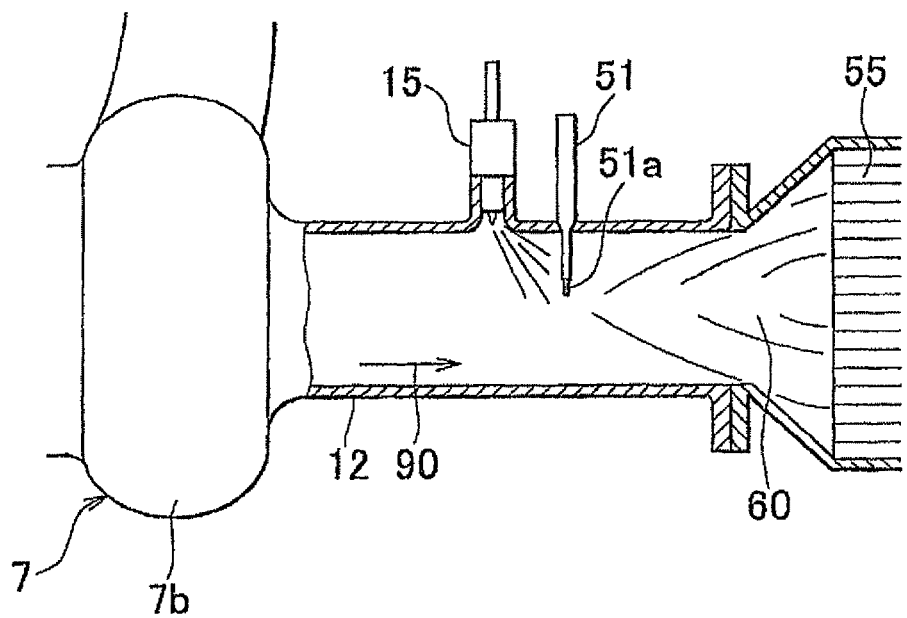
FIG. 2 is an enlarged schematic cross-sectional diagram of a portion of an exhaust pipe of the exhaust purification device of Embodiment 1.

An explanation follows next on an exhaust purification device of an internal combustion engine in Embodiment 1, with reference to FIGS. 1 to 12.

FIG. 1 illustrates an overall diagram of a compression-ignition type internal combustion engine in the embodiment. The embodiment will be explained based on an example of a diesel engine. The internal combustion engine is provided with an engine body 1 and an exhaust purification device (an exhaust gas control device). The engine body 1 has combustion chambers 2 of respective cylinders, electronically controlled fuel injection valves 3 for injecting fuel into the respective combustion chambers 2, an intake manifold 4 and an exhaust manifold 5.

The intake manifold 4 is connected, via an intake duct 6, to the outlet of a compressor 7a of an exhaust turbocharger 7. The inlet of the compressor 7a is connected to an air cleaner 9 via an intake air amount detector 8. A throttle valve 10, driven by a step motor, is disposed inside the intake duct 6. A cooling device 11 is further provided around the intake duct 6, to cool intake air that flows through the intake duct 6. In the example illustrated in FIG. 1, engine cooling water is led into the cooling device 11, where the intake air is cooled by the engine cooling water.

The exhaust manifold 5 is connected to the inlet of an exhaust turbine 7b of the exhaust turbocharger 7. The outlet of the exhaust turbine 7b is connected to an exhaust treatment device 55 via an exhaust pipe 12. The exhaust treatment device 55 is a device capable of purifying the exhaust discharged from the engine body 1. Examples of the exhaust treatment device 55 include, for instance, an oxidation catalyst, a HC adsorption catalyst, a particulate filter, a $NO_x$ storage catalyst or a $NO_x$ selective reducing catalyst.

In an exhaust passage upstream of the exhaust treatment device 55, i.e. in the exhaust pipe 12, there is disposed a fuel addition valve 15 as a fuel supply unit for supplying into the exhaust pipe 12 new unburned fuel that has not passed through the engine body 1. The fuel addition valve 15 is formed so as to have a fuel supply action of supplying fuel and discontinuing fuel supply. A glow plug 51, as a heating portion, is disposed between the fuel addition valve 15 and the exhaust treatment device 55. The glow plug 51 is formed so as to be capable of heating the surrounding atmosphere and of discontinuing that heating. The glow plug 51 has the function of igniting fuel that is injected by the fuel addition valve 15. The heating portion is not limited to a glow plug, and may also include, for example, a spark plug.

An exhaust gas re-circulation (EGR) passage 18 for exhaust gas re-circulation is disposed between the intake manifold 5 and the exhaust manifold 4. An electronically-controlled EGR control valve 19 is disposed in the EGR passage 18. A cooling device 20 for cooling the EGR gas that flows through the EGR passage 18 is provided around the EGR passage 18. In the example illustrated in FIG. 1, engine cooling water is led into the cooling device 20, where EGR gas is cooled by the engine cooling water.

The fuel injection valves 3 are connected to a common rail 22 via fuel supply pipes 21. The common rail 22 is connected to a fuel tank 24 via an electronically-controlled variable-throughput fuel pump 23. The fuel stored in the fuel tank 24 is supplied by the fuel pump 23 into the common rail 22. The fuel supplied into the common rail 22 is fed to the fuel injection valves 3 via the respective fuel supply pipes 21.

An electronic control unit 30 has a digital computer. The electronic control unit 30 in the embodiment functions as a control unit of the exhaust purification device. The electronic control unit 30 has a read only memory (ROM) 32, a random access memory (RAM) 33, a central processing unit (CPU) (microprocessor) 34, an input port 35 and an output port 36 that are connected to one another by way of a bi-directional bus 31.

A first temperature sensor 26 for detecting the temperature of the exhaust treatment device 55 is provided downstream of the exhaust treatment device 55. An air-fuel ratio sensor 56, for detecting the concentration of hydrocarbons (HC), as unburned fuel in the exhaust gas that passes through the engine body 1, is provided downstream of the exhaust treatment device 55. In the embodiment it is possible to determine, as described below, whether flame is generated or not on the basis of the output of the air-fuel ratio sensor 56. The output signals of the first temperature sensor 26 and the air-fuel ratio sensor 56 are input to the input port 35 by way of corresponding AD converters 37.

The output signal of an intake air amount detector 8 is input to the input port 35 via a corresponding AD converter 37. A load sensor 41 is connected to an accelerator pedal 40. The load sensor 41 generates output voltage that is proportional to the amount of depression L of the accelerator 40. The output voltage of the load sensor 41 is input to the input port 35 by way of a corresponding AD converter 37. A crank angle sensor 42, which generates an output pulse for instance every 15° of crankshaft rotation, is further connected to the input port 35.

The output port 36 is connected, via respective driving circuits 38, to the fuel injection valves 3, a step motor for driving the throttle valve 10, the EGR control valve 19 and the fuel pump 23. The output port 36 is also connected, via corresponding driving circuits 38, to the fuel addition valve 15 and the glow plug 51. The fuel addition valve 15 and the glow plug 51 of the embodiment are controlled by the electronic control unit 30.

FIG. 2 illustrates a schematic cross-sectional diagram of the exhaust pipe 12 in which there are disposed the fuel addition valve 15 and the glow plug 51 of the exhaust purification device of the embodiment. The exhaust pipe 12 has a tubular shape. The fuel addition valve 15 is disposed upstream of the exhaust treatment device 55 and of the glow plug 51. The fuel addition valve 15 of the embodiment is formed in such a way so as to inject fuel in an outward-radiating fashion. The fuel addition valve 15 is also formed in such a way so as to inject fuel in the form of a mist. The exhaust purification device of the embodiment is formed in such a manner that gas oil, which is the fuel of the engine body 1, is injected by the fuel addition valve 15. The fuel is not limited thereto, and there may be supplied a fuel different from the fuel of the engine body 1.

The glow plug 51 is disposed in such a way so as to heat the fuel supplied by the fuel addition valve 15. The glow plug 51 has a heat generating portion 51a that raises the temperature. The heat generating portion 51a in the exemplified device is formed at the leading end of the glow plug 51. The heat generating portion 51a may be disposed at a site other than the leading end of the heating portion. The fuel addition valve 15 in the embodiment is formed in such a way so as to inject fuel towards the heat generating portion 51a. The injection opening of the fuel addition valve 15 is aimed at the heat generating portion 51a of the glow plug 51. The glow plug 51 is disposed at a position such that the heat generating portion 51a comes into contact with the fuel injected by the fuel addition valve 15. The glow plug 51 and the fuel addition valve 15 of the embodiment are shaped as rods, but are not limited thereto, and may be constructed in any other shape.

The exhaust purification device of the internal combustion engine of the embodiment has a flame generating unit that generates a flame 60 by igniting the unburned fuel in the exhaust gas, and that causes the generated flame to reach the upstream end of the exhaust treatment device 55. The flame generating unit of the embodiment includes the glow plug 51, as a heating portion, and the fuel addition valve 15 that is disposed further upstream than the glow plug 51. The glow plug 51 is disposed in the vicinity of the exhaust treatment device 55 in such a manner that the generated flame 60 reaches the upstream end of the exhaust treatment device 55.

The exhaust gas discharged from the engine body 1 flows in the direction along which the exhaust pipe 12 extends, as denoted by arrow 90. The flame 60 can be generated when the oxygen concentration in the exhaust gas is equal to or greater than a predetermined value, and when the flow rate of the exhaust gas does not exceed a predetermined value. The generated flame 60 moves in the direction of the flow of the exhaust gas. In the embodiment, the flame 60 reaches the upstream end of the exhaust treatment device 55. Specifically, a mixed gas of the exhaust gas and the unburned fuel supplied by the fuel addition valve 15 reaches the exhaust treatment device 55 in a burned state. The flame 60 is hot, and thus the temperature of the exhaust treatment device 55 can be raised by having the flame 60 reach the exhaust treatment device 55. By way of the flame, in particular, the temperature can be raised in a short time up to a target temperature in cases where the temperature of the exhaust treatment device 55 must be raised.

Figure 3:
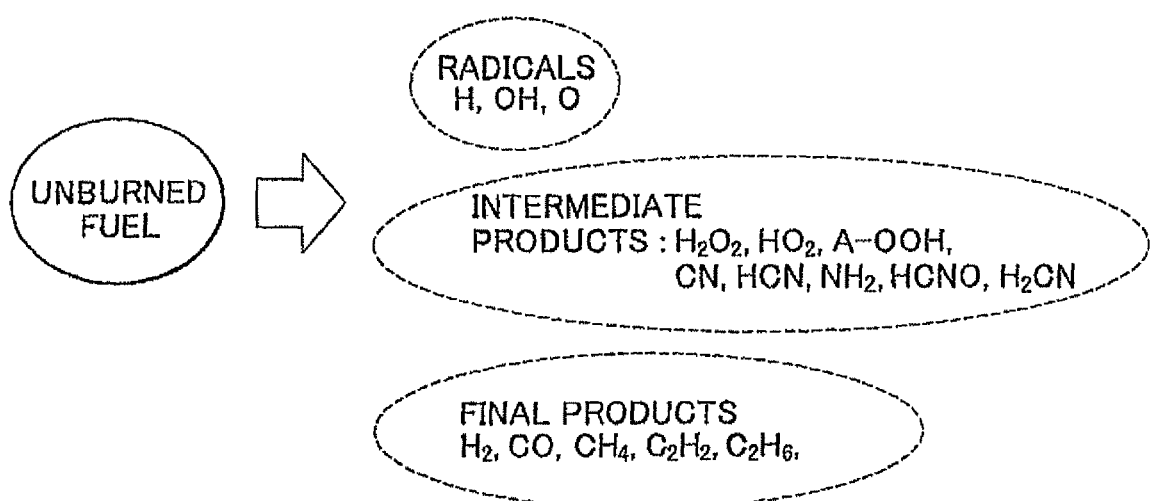
FIG. 3 is an explanatory diagram of substances that are generated during combustion of unburned fuel.

FIG. 3 illustrates an explanatory diagram of the substances generated by the flame during combustion of the unburned fuel. Radicals and intermediate products are generated as a result of a rise in temperature through burning of unburned fuel. Radicals are ionized substances. Intermediate products are substances that exist transiently before being converted into final products. These final products include water, carbon dioxide, and also combustible reducing agents. In the embodiment, the active substances denotes substances that are temporarily generated by a flame, and which enhance the reactivity of oxidation reactions or reduction reactions in the exhaust purification device.

Radicals include herein oxidizing agents having oxidizing power, such as OH radicals or O radicals, and reducing agents having reducing power, such as H radicals or the like. Intermediate products include, for instance, $HO_2$, $H_2O_2$ or the like that function as an oxidizing agent, or CN, HCN or the like that function as a reducing agent. Final products include, for instance, $H_2$, CO or the like that function as combustible reducing agents.

The radicals and intermediate products are suitable oxidizing agents or reducing agents having excellent oxidizing power or reducing power. However, radicals become stable substances as temperature drops outside the region at which the flame is generated. The intermediate products are unstable substances generated halfway during a reaction, and hence become stable substances as temperature drops outside the region at which the flame is generated.

In the invention, the flame generated in the flame generating unit can be supplied directly to the exhaust treatment device 55, and hence active substances can be supplied to the exhaust treatment device 55. As a result, this allows promoting the oxidation reaction or reduction reaction in the exhaust treatment device 55.

Figure 4:
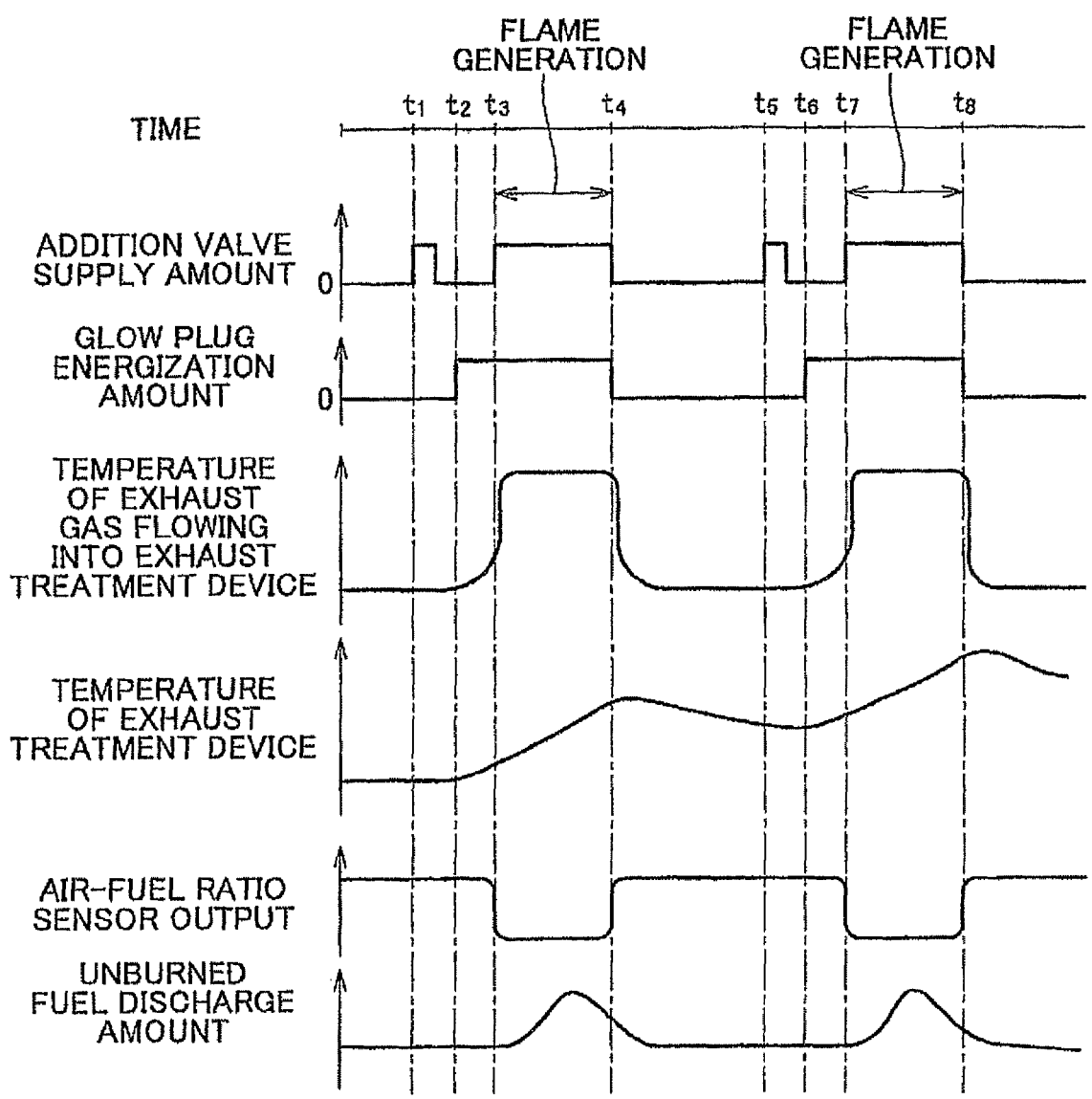
FIG. 4 is a time chart of a first operation control in Embodiment 1.

FIG. 4 illustrates a time chart of a first operation control of the exhaust purification device in the embodiment. The exhaust purification device is controlled in such a manner that large amounts of active substances are supplied to the exhaust treatment device 55. In the embodiment, the unburned fuel is caused to adhere to the upstream end of the exhaust treatment device, before the flame reaches the exhaust treatment device. Adhesion of unburned fuel in the embodiment of the invention means that at least part of the unburned fuel sticks, in an exposed state, onto a target object. Adhesion encompasses here both physical adsorption and chemical adsorption.

With the unburned fuel thus adhered to the upstream end of the exhaust treatment device 55, arrival of the flame 60 to the upstream end of the exhaust treatment device 55 causes the adhered unburned fuel to burn and generate thereby new active substances. Generation of active substances at the inlet of the exhaust treatment device 55 allows supplying a large amount of active substances into the exhaust treatment device 55 before the active substances are depleted. The active substances elicit oxidation reactions or reduction reactions inside the exhaust treatment device 55.

An instance of supply of unburned fuel by the fuel addition valve 15 at a time $t_1$ will be explained next with reference to FIGS. 4 and 2. The fuel addition valve 15 in the embodiment supplies unburned fuel in a pulse-like fashion. At this point in time, the glow plug 51 has not been energized, and the temperature of the exhaust gas is lower than the ignition temperature of the unburned fuel that is supplied by the fuel addition valve 15. The unburned fuel flows along with the exhaust gas towards the exhaust treatment device 55. The unburned fuel adheres to the upstream end of the exhaust treatment device 55. Unburned fuel can become thus adhered, before flame generation, through preliminary supply of fuel.

Next, the glow plug 51 is energized at time $t_2$. The temperature of the heat generating portion 51a rises through energization of the glow plug 51. The glow plug 51 is thus preheated before ignition of the fuel that is supplied by the fuel addition valve 15. In the embodiment, preheating of the glow plug is carried out until the temperature of the heat generating portion 51a is equal to or higher than the temperature at which the unburned fuel supplied by the fuel addition valve 15 can ignite. The temperature of the atmosphere around the heat generating portion 51a of the glow plug can be raised thus through preheating of the glow plug.

Once the temperature of the heat generating portion 51a of the glow plug 51 has reached the ignition temperature, the fuel addition valve 15 supplies fuel to generate a flame at time $t_3$. Flame is generated downstream of the glow plug. The temperature of the exhaust gas flowing into the exhaust treatment device 55 rises abruptly. As a result, the temperature of the exhaust treatment device 55 can also rise in a short time. Supply of fuel by the fuel addition valve 15 is discontinued at time $t_4$. Energization of the glow plug 51 is discontinued also at time $t_4$, and the generated flame 60 is extinguished. The temperature of the exhaust gas flowing into the exhaust treatment device 55 reverts to the original exhaust gas temperature. Single flame generation can be carried out as described above.

In the embodiment, flame generation is carried out intermittently over a number of times. That is, flame is generated over a number of times through intercalation of periods during which no flame is generated. The period from time $t_5$ to time $t_8$ is a period in which a second flame is generated, and in which control is performed in the same way as from time $t_1$, to time $t_4$.

Unburned fuel is allowed to adhere to the upstream end of the exhaust treatment device 55, before ignition, through preliminary supply of fuel by the fuel addition valve 15 at time $t_1$. Flame generation at time $t_3$ allows the adhered unburned fuel to burn. In particular, the unburned fuel adhered to the upstream end can be made to burn on account of the strongly oxidizing OH radicals and O radicals that are present in the flame. The above combustion causes the temperature to rise and results in further formation of active substances. In the embodiment, the distance from the end of the exhaust treatment device 55 to the interior of the exhaust treatment device 55 is short, and the flame penetrates into the exhaust treatment device 55. As a result, the active substances generated at the end of the exhaust treatment device 55 can be supplied into the interior of the exhaust treatment device 55. The supplied active substances have highly oxidizing ability or reducing ability. This promotes as a result oxidation reactions or reduction reactions in the exhaust treatment device 55.

Figure 5:
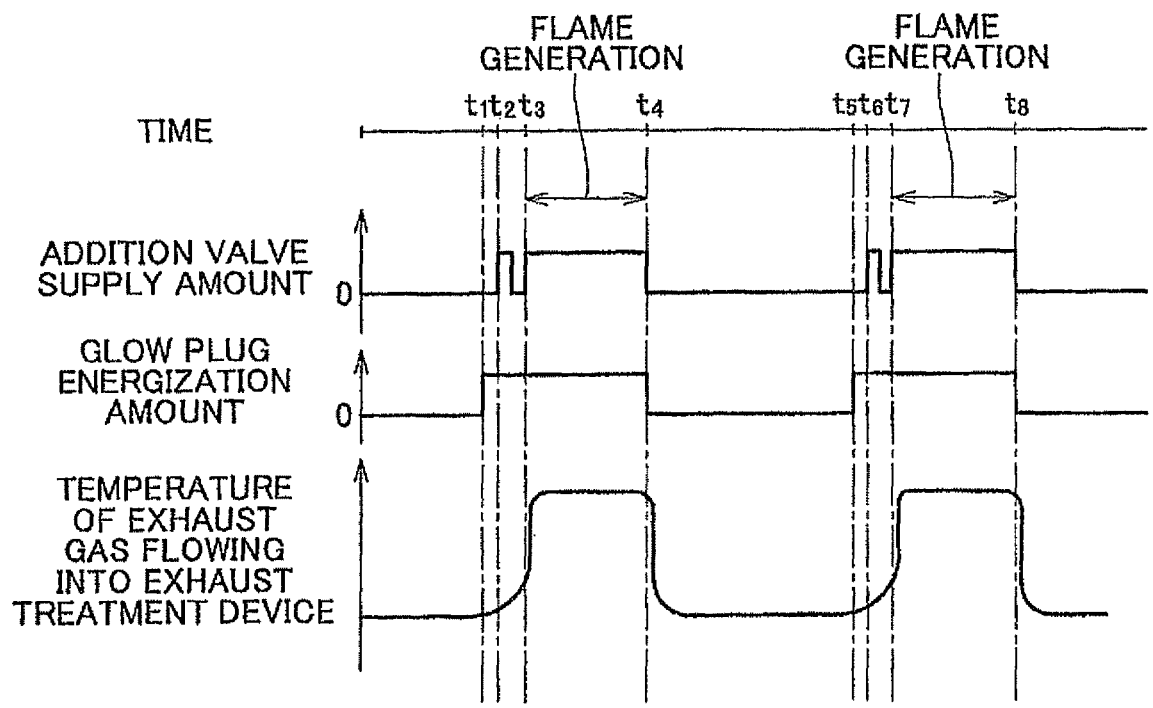
FIG. 5 is a time chart of a second operation control in Embodiment 1.

FIG. 5 is a time chart of a second operation control in the embodiment. In the second operation control, the glow plug starts being energized at time $t_1$. Preliminary supply of fuel by the fuel addition valve 15 takes place at time $t_2$. In this preliminary supply, the unburned fuel is supplied in the form of a pulse. A period in which no unburned fuel is supplied is interposed between preliminary supply of unburned fuel and supply of unburned fuel for flame generation. Thus, unburned fuel is supplied by the fuel addition valve 15, to become adhered to the upstream end of the exhaust treatment device 55, from energization start of the glow plug until the temperature of the glow plug reaches the ignition temperature of the unburned fuel.

Preheating of the glow plug 51 causes the temperature to rise until the temperature of the glow plug 51 reaches the ignition temperature of the unburned fuel. Once the temperature of the glow plug 51 reaches a temperature at which the unburned fuel can ignite, at time $t_3$, flame is generated through supply of unburned fuel by the fuel addition valve 15. Flame generation is carried out until time $t_4$. Supply of unburned fuel by the fuel addition valve 15 is discontinued at time $t_4$. Energization of the glow plug 51 is discontinued also at time $t_4$. A period of flame non-generation is interposed thereafter, and then flame generation is repeated in the same way from time $t_5$ to time $t_8$.

Preliminary supply of unburned fuel for causing the unburned fuel to adhere to the upstream end of the exhaust treatment device 55 can be carried out before the ignition of the unburned fuel and flame arrival, as illustrated in FIGS. 4 and 5. The period in which the unburned fuel is ignited can be selected, for instance, from the time of energization start of the glow plug 51 until a predetermined time has elapsed therefrom.

Figure 6:
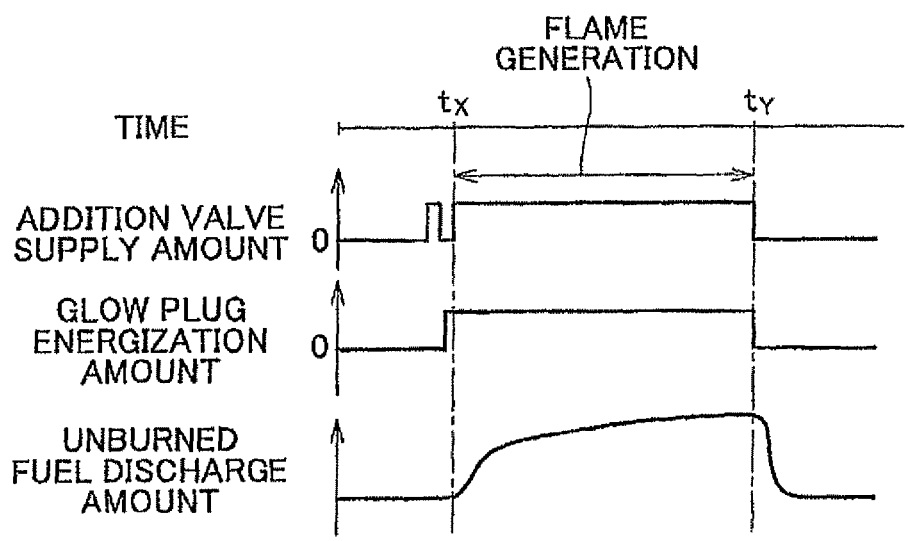
FIG. 6 is a time chart of a third operation control, as a comparative example, in Embodiment 1.

FIG. 6 illustrates a time chart of a third operation control in the embodiment. The third operation control is a comparative example of operation control. In the third operation control, fuel is supplied by the fuel addition valve to cause unburned fuel to become adhered to the upstream end of the exhaust treatment device, after which glow plug energization starts. Thereafter, ignition takes place at time $t_X$, and flame generation continues until time $t_Y$. In this comparative example, flame is generated just once, not a plurality of times. The flame generation time is prolonged through continuous generation of flame. For instance, only one flame is generated when oxidation reactions or reduction reactions are carried out once in the exhaust treatment device.

In the third operation control, as a comparative example, the unburned fuel adhered to the upstream end of the exhaust treatment device is depleted halfway during the flame generation period. That is, the unburned fuel adhered to the upstream end of the exhaust treatment device burns off completely, and thus fewer active substances are supplied into the exhaust treatment device. Also, continuous flame generation causes oxygen inside the exhaust treatment device to be depleted. This results in a gradual increase of the discharge amount of unburned fuel that gets past the exhaust treatment device and is discharged out of the exhaust treatment device.

By contrast, flame is intermittently generated a plurality of times in the first operation control or the second operation control, as illustrated in FIGS. 4 and 5. Flame is generated intermittently a plurality of times when oxidation reactions or reduction reactions are carried out once in the exhaust treatment device 55. Performing control in the above way allows a required amount of unburned fuel to be adhered to the upstream end of the exhaust treatment device 55 before each flame generation, and allows preventing the unburned fuel adhered to the upstream end of the exhaust treatment device 55 from being depleted halfway during each flame generation period. As a result, a large amount of active substances can be supplied stably into the exhaust treatment device 55.

Also, carrying out flame generation intermittently over a number of times enables oxygen uptake from the exhaust gas during the periods at which no flame is generated. As a result, this allows reducing significantly the amount of unburned fuel that does not burn in the exhaust treatment device 55 and is discharged out of the exhaust treatment device 55. Thus, flame generation is preferably carried out intermittently over a number of times.

Figure 7:
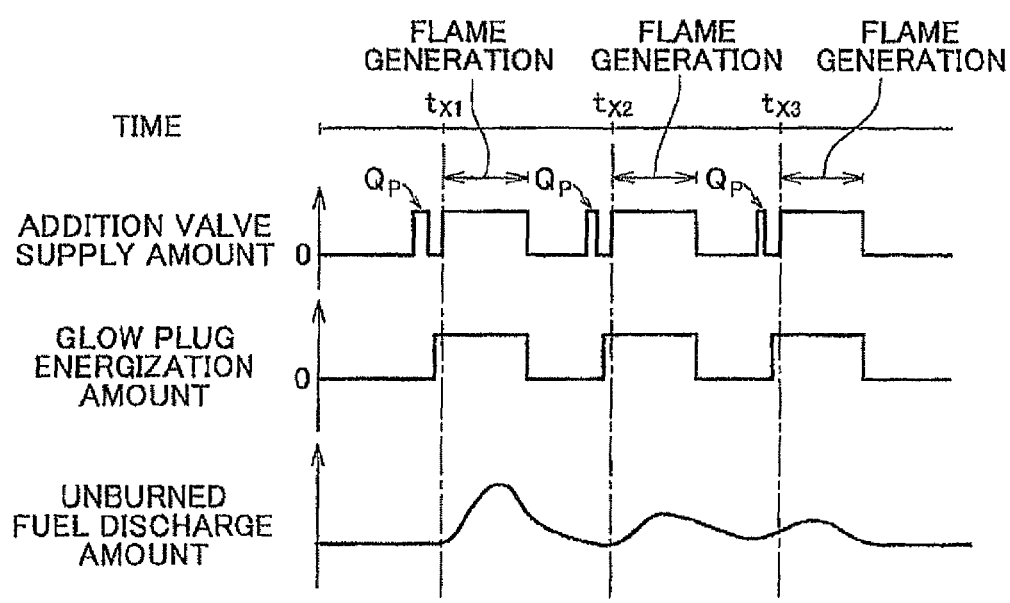
FIG. 7 is a time chart of a fourth operation control in Embodiment 1.

FIG. 7 illustrates a time chart of a fourth operation control in the embodiment. In the fourth operation control the amount of unburned fuel adhered to the exhaust treatment device 55 upon any of a second and subsequent flame generations, from among a plurality of flame generations, is smaller than the amount of unburned fuel adhered to the exhaust treatment device 55 upon a first flame generation. Specifically, a preliminary supply amount $Q_P$ of unburned fuel upon a second and subsequent flame generations is set to be smaller than the supply amount $Q_P$ of preliminary unburned fuel upon the first flame generation. In the embodiment, the amount $Q_P$ of unburned fuel adhered to the upstream end of the exhaust treatment device 55 decreases gradually as the number of flame generations grows. Ignition of the first flame generation is carried out at time $t_{X1}$, ignition of the second flame generation is carried out at time $t_{X2}$, and ignition of the third flame generation is carried out at time $t_{X3}$.

In intermittent flame generation, some residual adhered unburned fuel of a previous flame generation may persist without having been consumed completely in a single flame generation. Preliminary supply such as the above-described one allows unburned fuel to be adhered to the upstream end of the exhaust treatment device 55 at all times during periods of flame generation. Active substances can be generated thus out of the adhered unburned fuel throughout the periods of flame generation.

However, some unburned fuel adhered to the upstream end of the exhaust treatment device 55 persists also after the first flame generation. Therefore, the amount of preliminary unburned fuel that is supplied before flame generation is reduced in any flame generation from the second flame generation onwards. Performing control in the above way allows preventing the unburned fuel at the upstream end of the exhaust treatment device 55 from being depleted during a flame generation, while averting at the same time excessive adhesion of unburned fuel. The amount of unburned fuel that gets through the exhaust treatment device 55 can be reduced, as a result. Alternatively, performing control in the above way allows reducing consumption of fuel during oxidation reactions, reduction reactions and temperature raising in the exhaust treatment device 55.

Figure 8:
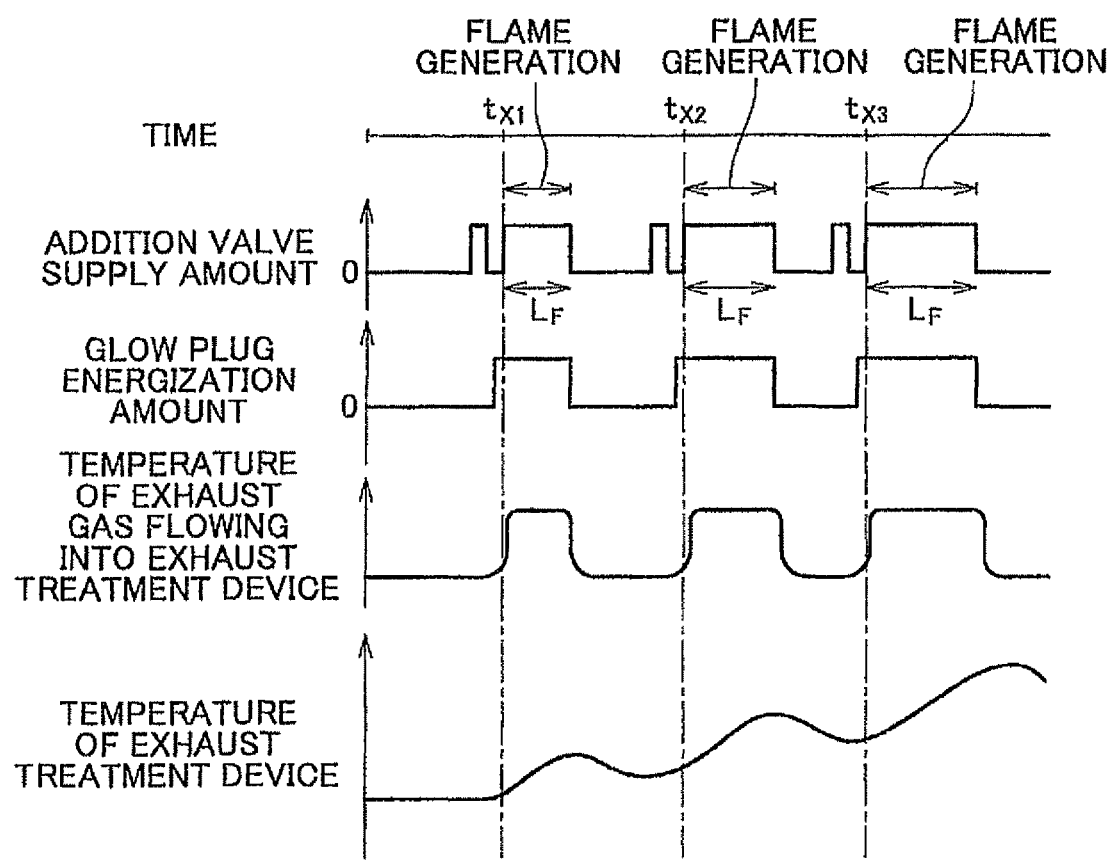
FIG. 8 is a time chart of a fifth operation control in Embodiment 1.

FIG. 8 illustrates a time chart of a fifth operation control in the embodiment. In the fifth operation control, the time of flame generation upon any of a second and subsequent flame generations, from among a plurality of flame generations, is set to be longer than the time of flame generation upon a first flame generation. In the embodiment, the single flame generation time is lengthened gradually as the number of flame generations grows. Ignition takes place at time $t_{x1}$, time $t_{x2}$ or time $t_{x3}$. The time $L_F$ over which the respective flame generations takes place becomes gradually longer from the first to the third flame generation.

Raising of the temperature (bed temperature) of the exhaust treatment device 55 may promote oxidation reactions and reduction reactions in the exhaust treatment device 55. For instance, higher temperatures accelerate oxidation reactions in the exhaust treatment device 55 in the case where the exhaust treatment device 55 includes an oxidation catalyst. In the fifth operation control, the flame generation time is prolonged in concert with the rising temperature in the exhaust treatment device 55. A rise in the temperature of the exhaust treatment device 55 results in a faster reaction rate in the exhaust treatment device 55. This allows suppressing slip-through of unburned fuel even upon prolonged flame generation. As a result, the flame generation time can be prolonged, so that the intended reactions can take place in a short time in the exhaust treatment device 55.

Alternatively, control may be performed so as to increase the temperature of the flame that is generated during the flame generation periods. In a sixth operation control of the embodiment, the temperature of the flame In any of a second and subsequent flame generations is raised above the flame temperature in the first flame generation. In any of a second and subsequent flame generations, the amount of unburned fuel that is supplied by the fuel addition valve 15 is increased vis-à-vis that of the first flame generation. For instance, flame temperature can be increased by supplying the maximum amount of unburned fuel within a range in which the unburned fuel supplied by the fuel addition valve 15 burns completely. A higher temperature results in faster reaction rates, which in turn allows suppressing slip-through of unburned fuel.

Performing control so as to raise the flame temperature allows reducing the unburned fuel that gets past the exhaust treatment device 55, and allows raising the temperature of the exhaust treatment device 55 in a short time. High-temperature flame can be supplied thus to the exhaust treatment device 55, and hence large amounts of active substances can be formed out of the unburned fuel adhered to the upstream end of the exhaust treatment device 55. The intended reactions can take place in a short time since large amounts of active substances can be supplied to the exhaust treatment device 55. The temperature of the exhaust treatment device 55 can be raised fast by oxidation heat when oxidation reactions take place in the exhaust treatment device 55.

Figure 9:
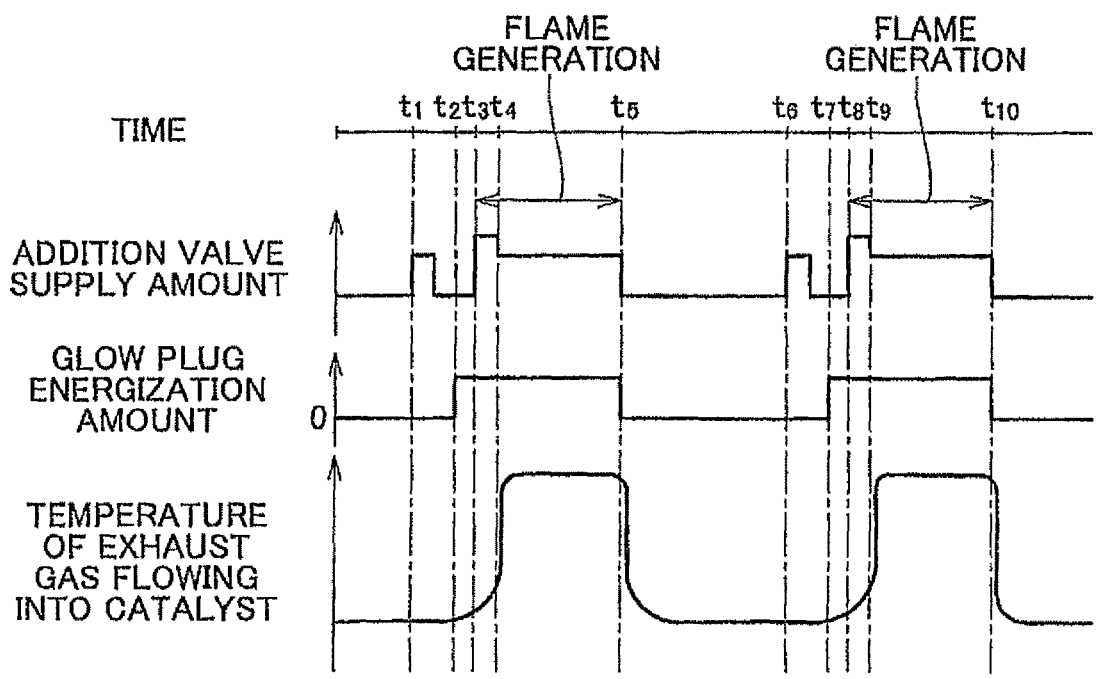
FIG. 9 is a time chart of a seventh operation control in Embodiment 1.

FIG. 9 illustrates a time chart of a seventh operation control in the embodiment. In the seventh operation control, an amount of unburned fuel greater than the minimum amount required for flame generation is supplied by the fuel addition valve 15 after the temperature of the glow plug 51 has reached the ignition temperature of the unburned fuel.

At time $t_1$, fuel becomes adhered to the upstream end of the exhaust treatment device 55 through preliminary fuel supply by the fuel addition valve 15. Preliminary fuel supply is performed in the form of a pulse. Energization of the glow plug 51 starts at time $t_2$. The temperature of the glow plug 51 rises. When the temperature of the glow plug 51 reaches the ignition temperature of the unburned fuel, at time $t_3$, there ignites the unburned fuel supplied by the fuel addition valve 15.

Upon ignition of the unburned fuel at time $t_3$, unburned fuel is supplied in a greater amount than the minimum amount required for flame generation. For instance, unburned fuel is supplied in an amount such that some of the unburned fuel reaches the exhaust treatment device 55 without having burned completely. Some of the unburned fuel can become adhered to the upstream end of the exhaust treatment device 55. In addition to the adhered fuel that has been supplied preliminarily, further unburned fuel can become adhered to the upstream end of the exhaust treatment device 55 during early combustion.

The temperature of the generated flame is comparatively low immediately after ignition, and thus substantial supply of unburned fuel allows the unburned fuel to reach the exhaust treatment device 55 in the form of unburned fuel that has not burned completely. Fuel can reach also the exhaust treatment device 55 in an unburned fuel state through the influence of, among others, the temperature of the exhaust pipe 12, when, for instance, the temperature around the exhaust pipe 12 is not high enough. More unburned fuel can become thus adhered to the exhaust treatment device 55, in addition to the unburned fuel already adhered to the exhaust treatment device 55.

The amount of unburned fuel supplied by the fuel addition valve 15 is reduced at time $t_4$. Flame generation continues from time $t_4$ to time $t_5$. Flame generation is discontinued at time $t_5$. An interval of flame non-generation follows next, after which flame generation is repeated. From time $t_6$ to time $t_{10}$ control is performed in the same way as from time $t_1$ to time $t_5$. In the seventh operation control, thus, a large amount of unburned fuel can become adhered to the upstream end face of the exhaust treatment device 55. Thereupon, flame generation allows active substances to be supplied to the exhaust treatment device 55.

An explanation follows next on determination of whether flame is generated or not in the exhaust purification device. The exhaust purification device of the internal combustion engine of the embodiment has a flame state determination unit that determines whether a flame is generated or not. With reference to FIG. 1, the flame state determination unit has an air-fuel ratio sensor 56. In the embodiment, the flame state determination unit determines whether a flame is generated or not by detecting an output signal from the air-fuel ratio sensor 56.

Figure 10:
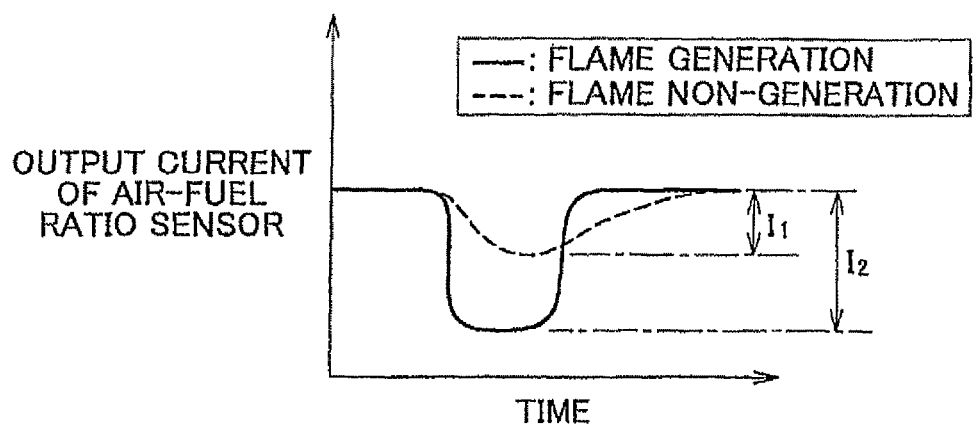
FIG. 10 is a graph explaining changes in the output current of an air-fuel ratio sensor during flame generation.

FIG. 10 is a graph for explaining the output signal from the air-fuel ratio sensor 56. The X-axis represents time and the Y-axis represents the output current of the air-fuel ratio sensor 56. The air-fuel ratio sensor 56 in the embodiment is a whole-region type air-fuel ratio sensor. The ratio between air and fuel (hydrocarbon) in the exhaust gas that is supplied to an intake passage, a combustion chamber or an exhaust passage is called the air-fuel ratio of the exhaust gas. The output current of the air-fuel ratio sensor 56 decreases as the air-fuel ratio of the exhaust gas becomes smaller (as the air-fuel ratio of the exhaust gas becomes richer). The air-fuel ratio sensor 56 in the embodiment is a linear air-fuel ratio sensor that can detect the air-fuel ratio in respective states of the exhaust gas.

FIG. 10 illustrates an instance where flame is generated, and an instance where flame is not generated, when fuel is supplied by the fuel addition valve 15. When no flame is generated, the unburned fuel becomes adhered to the exhaust treatment device 55 as-is, in liquid form, and thus there is little unburned fuel that gets past the exhaust treatment device 55. The corresponding shape in the graph is substantially that of a reverse hillock in which the decrease $I_1$ of output current is small. When flame is generated, by contrast, the unburned fuel burns and, in addition, the unburned fuel adhered to the exhaust treatment device 55 burns off the exhaust treatment device 55, so that there is a substantial outflow of unburned fuel from the exhaust treatment device 55. The decrease $I_2$ in the output current of the air-fuel ratio sensor 56 becomes larger. For instance, a criterion value $I_X$ for the decrease in the air-fuel ratio sensor 56 is set beforehand. Upon supply of fuel by the fuel addition valve 15, it can be determined that flame is generated if the decrease in the air-fuel ratio sensor 56 is smaller than the criterion value $I_x$, and that flame is not generated when the decrease is greater than the criterion value $I_x$. When the exhaust treatment device 55 includes an oxidation catalyst, flame generation causes the temperature of the catalyst to rise, whereby the catalyst becomes activated, and causes also the oxygen in the exhaust gas to be consumed. The detected air-fuel ratio becomes smaller as a result.

In the embodiment, thus, ignition is determined by arranging the air-fuel ratio sensor 56 downstream of the exhaust treatment device 55. The flame state determination unit may have, for instance, a $NO_x$ sensor, an Oxygen sensor, or an exhaust temperature sensor.

In the case where a $NO_x$ sensor is installed to determine the state of flame generation, a predetermined amount of $NO_x$ corresponding to ignition is detected upon ignition of the unburned fuel supplied by the fuel addition valve 15. By contrast, the output signal from the $NO_x$ sensor is substantially constant when the fuel supplied by the fuel addition valve 15 is not ignited. Occurrence of flame generation can be determined when the output signal of the $NO_x$ sensor is equal to or greater than a criterion value. Non-occurrence of flame generation can be determined when the output signal of the $NO_x$ sensor is smaller than a criterion value.

Determination in the air-fuel ratio sensor 56 can be carried out in the same way in order to determine the state of flame generation when an oxygen sensor is installed. In the case where a temperature sensor for detecting the temperature of the exhaust gas is installed in order to determine the state of flame generation, flame generation entails a high exhaust temperature, while flame non-generation entails a low exhaust temperature. Upon supply of unburned fuel from the fuel addition valve 15, flame generation can be thus determined when the temperature of the exhaust gas is equal to or higher than a criterion value. Flame non-generation can be determined when the temperature of the exhaust gas is lower than the criterion value.

The exhaust purification device of the internal combustion engine of the embodiment is formed in such a manner so as to enable flame generation control when a flame is generated, and to enable flame non-generation control when a flame is not generated. The exhaust purification device of the embodiment is formed in such a manner that the flame state determination unit determines whether a flame is generated or not, whereupon the exhaust purification device selects either flame generation control or flame non-generation control.

Selecting thus the above Control modes allows detecting appropriately values that change depending on whether flame is generated or not. For instance, when the electronic control unit 30 has stored therein a map for calculating the bed temperature from the upstream end to the downstream end of the exhaust treatment device 55, then there are respectively stored a map of when flame is generated and a map of when flame is not generated. The bed temperature from the upstream end up to the downstream end of the exhaust treatment device 55 can be accurately calculated by switching between maps depending on whether flame is generated or not.

Alternatively, when for instance the electronic control unit 30 has stored therein a map for calculating the oxidation or reduction reaction amount in the exhaust treatment device 55, or for calculating the purification amount upon removal of deposited matter at the exhaust treatment device 55, then there are respectively stored a map of when flame is generated and a map of when flame is not generated, so that the calculations can be performed more accurately by switching between maps in accordance with the flame generation state. Any control can be performed more accurately by storing criterion values, tolerances and so forth as values when flame is generated and as values when flame is not generated, and by switching between values in accordance with the flame generation state.

The exhaust purification device of the internal combustion engine of the embodiment has a deposition amount detection unit that detects the amount of soot deposited on either the flame generating unit or the exhaust treatment device 55. Flame generation may cause soot to become deposited on, for instance, the glow plug 51 and the exhaust treatment device 55. For instance, soot is deposited upon continued low-temperature operation, in which exhaust gas is at a low temperature, or immediately after the fuel addition valve 15 increases the supply amount of unburned fuel. Also, soot becomes deposited, for instance, immediately after an increase in the engine speed, and upon continued idling operation of the internal combustion engine. Likewise, soot becomes deposited upon discharge of a predetermined amount of particulate matter from the engine body 1, after regeneration of a particulate filter.

The deposition amount detection unit in the embodiment detects the deposition amount of soot based on the operation state history of the internal combustion engine. In the case of low-temperature operation of the internal combustion engine, for instance, the deposition amount detection unit detects the deposition amount of the soot by calculating the time over which the exhaust gas is at or below a predetermined temperature. Alternatively, the deposition amount detection unit detects the deposition amount of soot by detecting increases in the supply amount of unburned fuel by the fuel addition valve 15.

In the embodiment, flame is generated by the flame generating unit when the detected amount of deposited soot exceeds an allowable value. Soot deposited at a predetermined site can be burned off through flame generation. In other control modes, soot deposited at a predetermined site May also be burned off through recurrent flame generation over a number of times.

Alternatively, flame generation may be omitted and the deposited soot may be burned off by heat and/or radiation resulting from energizing the glow plug 51. For instance, the deposited soot can be burned off by increasing the number of times that the glow plug 51 is energized during preheating of the glow plug 51, or by prolonging the energization time of the glow plug 51, before ignition.

Figure 11:
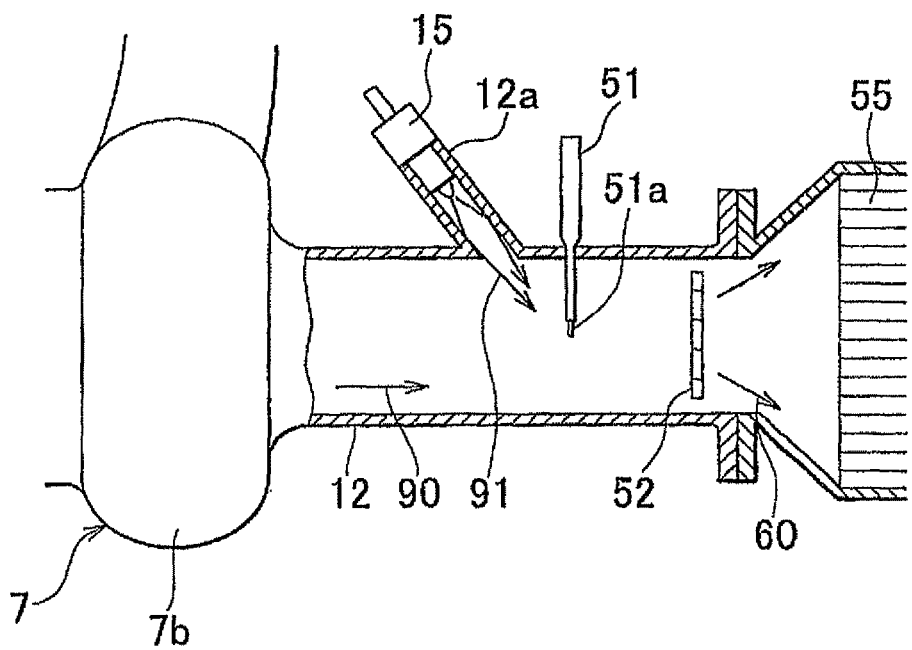
FIG. 11 is an enlarged schematic cross-sectional diagram of an exhaust pipe portion of another exhaust purification device in Embodiment 1.

FIG. 11 illustrates an enlarged schematic cross-sectional diagram of another exhaust purification device of an internal combustion engine of the embodiment. FIG. 11 is an enlarged schematic cross-sectional diagram of a portion of the exhaust pipe 12 in the exhaust purification device. This other exhaust purification device of an internal combustion engine has a jutting pipe 12a. The jutting pipe 12a is connected to the exhaust pipe 12 and is formed so as to extend out of the exhaust pipe 12. The fuel addition valve 15 is disposed at the outward end of the jutting pipe 12a. The fuel addition valve 15 is disposed in such a way so as to inject fuel in the direction along which the jutting pipe 12a extends. The heat generating portion 51a of the glow plug 51 is disposed at a prolongation of the direction in which the jutting pipe 12a extends.

The unburned fuel supplied by the fuel addition valve 15 is reflected on the wall of the jutting pipe 12a towards the heat generating portion 51a, as indicated by arrow 91. Reflection of the unburned fuel on the wall of the jutting pipe 12a allows the unburned fuel to become finely divided. A larger particle size of the unburned fuel may cause the temperature of the heat generating portion 51a of the glow plug 51 to drop owing to the heat of vaporization of the unburned fuel, when the unburned fuel reaches the heat generating portion 51a. A finer unburned fuel allows curtailing drops in the temperature of the heat generating portion 51a, and allows thus enhancing ignitability.

Scattering of the fuel supplied by the fuel addition valve 15 can be suppressed by supplying the unburned fuel along the jutting pipe 12a. The supplied unburned fuel can be thus kept tightly together. Also, the density of the unburned fuel at the heat generating portion 51a of the glow plug 51 can be increased, so that the unburned fuel concentrates around the heat generating portion 51a. Upon combustion, therefore, the fuel can gasify instantly, with dramatic flame expansion. The flame can spread as a result throughout the entire exhaust pipe 12. A uniform flame can thus be supplied over the entire end face of the exhaust treatment device 55 that is disposed downstream of the glow plug 51.

In this other exhaust treatment device, a flow-disturbing agitator is disposed between the glow plug 51 and the exhaust treatment device 55. In the example of the device illustrated in FIG. 11, a swirler 52 is disposed as the agitator. The swirler 52 is formed, for instance, of a coarse wire mesh. The swirler 52 is formed in such a way so as to disturb the flow of the generated flame. As indicated by arrow 92, providing the swirler 52 has the effect of spreading the flame, so that the flame can be supplied over the entire upstream end face of the exhaust treatment device 55.

A flame can be thus supplied over the entire end face of the exhaust treatment device 55 by arranging an agitator, for disturbing flame flow, between the flame generation point and the exhaust treatment device 55. Active substances can be supplied thereby to the entire exhaust treatment device 55. The agitator is not limited to a swirler, and may be any device that disturbs flame flow. For instance, the agitator may be formed so as to generate swirling flow. Alternatively, a bent-pipe portion may be interposed, or a cone portion may be formed in such a manner that pipe diameter varies gradually, to disturb thereby flame flow and allow supplying flame over the entire upstream end face of the exhaust treatment device 55.

A small oxidation catalyst can be disposed downstream of the glow plug 51. The small oxidation catalyst has a smaller cross-sectional area than the cross-sectional area of the exhaust pipe 12. The small-oxidation catalyst is shaped, for instance, as a honeycomb in which a plurality of channels are disposed extending substantially parallel to the direction along which the exhaust pipe 12 extends. The small oxidation catalyst is disposed at substantially the central portion inside the exhaust pipe 12, so that flow paths of the exhaust gas are formed around the small oxidation catalyst. The small oxidation catalyst thus disposed can function as an agitator that disturbs flame flow while, at the same time, the unburned fuel can be reformed inside the small oxidation catalyst. The gas flowing from the small oxidation catalyst can be burned off by setting the outlet temperature of the small oxidation catalyst to be equal to or greater than a predetermined temperature. Doing so enables and promotes flame generation at the outlet of the small oxidation catalyst.

In this other exhaust purification device, soot may adhere to the wall face of the jutting pipe 12a. Soot adhered to the wall face of the jutting pipe 12a impairs the unburned fuel reflecting and atomizing function of the jutting pipe 12a. In such cases, the glow plug 51 is energized to allow soot to burn off on account of the radiant heat of the heat generating portion 51a.

In the embodiment, ignition takes place after the glow plug 51 has been preheated for a predetermined time, but the embodiment is not limited thereto, and the preheating time of the glow plug 51 can be modified based on the detected exhaust gas temperature or flow rate. Specifically, there may be modified the period of fuel supply by the fuel addition valve 15 for flame generation after energization of the glow plug 51. When the exhaust gas temperature is high, temperature rises fast in the glow plug 51, whereas when the exhaust gas temperature is low, temperature rises slowly in the glow plug 51. When the exhaust gas flow rate is small, temperature rises fast in the glow plug 51, whereas when the exhaust gas flow rate is large, temperature rises slowly in the glow plug 51. When temperature rises fast in the glow plug 51, control can be performed so as to shorten the preheating time of the glow plug 51.

In the embodiment, fuel is supplied in pulses by the fuel addition valve 15, before supply of unburned fuel for flame generation, in order to cause unburned fuel to become adhered to the upstream end of the exhaust treatment device 55. However, the embodiment is not limited thereto, and supply of fuel for unburned fuel adhesion and supply of fuel for flame generation may be carried out in succession.

The temperature of exhaust gas can be detected, for instance, by way of a temperature sensor disposed downstream of the exhaust treatment device 55. The flow rate of the exhaust gas can be calculated, for instance, on the basis of the intake air amount of the engine body 1, or on the basis of the EGR amount. A preheating time can be selected, for instance, by storing a preheating time map of a function between the detected temperature and flow rate of the exhaust gas. Also the period of fuel ignition may be selected by calculating the temperature of the heat generating portion of the glow plug 51, or the temperature of the exhaust gas around the heat generating portion 51a, on the basis of the flow rate and/or temperature of the exhaust gas.

The fuel supply unit in the embodiment includes the fuel addition valve 15. For instance, unburned fuel can be supplied into the exhaust passage by modifying the injection pattern in the combustion chambers 2.

Figure 12:
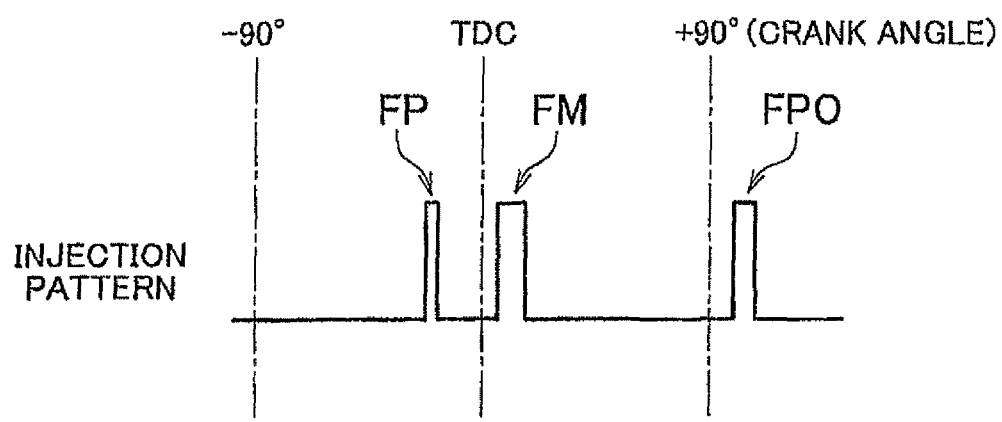
FIG. 12 is an explanatory diagram of an injection pattern in a combustion chamber.

FIG. 12 illustrates an injection pattern during supply of unburned fuel into the exhaust passage in the embodiment. FIG. 12 is a fuel injection pattern in the fuel chambers 2. In ordinary operation, main injection FM takes place at substantially a compression top dead center TDC. Main injection FM takes place when the crank angle is substantially 0°. A pilot injection FP is performed before the main injection FM, in order to stabilize combustion during the main injection FM. In addition to the fuel injection pattern during ordinary operation, post injection FPO is performed after the main injection FM in cases where unburned fuel is supplied to the exhaust passage. The post injection FPO is carried out at a period of no fuel combustion in the combustion chambers 2. The post injection FPO is carried out, for instance, between a crank angle of substantially 90° to substantially 120°, after the compression top dead center. The post injection FPO allows unburned fuel to be supplied into the exhaust passage. The amount of unburned fuel supplied into the exhaust passage can be adjusted by regulating the injection amount of the post injection FPO.

In the fuel supply unit of the embodiment unburned fuel is supplied by one fuel addition valve 15. However, the fuel supply unit is not limited thereto, and may have a plurality of types of unburned fuel-supplying devices disposed at a plurality of sites. For instance, unburned fuel may be supplied into the exhaust passage through supply of exhaust by a fuel addition valve, with a varying fuel injection pattern.

With reference to FIG. 1, an explanation follows next on an exhaust purification device of an internal combustion engine of Embodiment 2. The explanation in the embodiment describes an instance where the exhaust treatment device 55, at whose end face a flame arrives in Embodiment 1, is provided with an oxidation catalyst having HC adsorption ability, a particulate filter, or a $NO_x$ selective reducing catalyst.

An instance will be explained first, with reference to FIG. 1, in which the exhaust treatment device 55 is provided with an oxidation catalyst having HC adsorption ability. The oxidation catalyst is a catalyst having oxidizing power for carrying out exhaust purification. The oxidation catalyst is provided with, for instance, a tubular case body inside which there is disposed a substrate having partition walls that extend in the direction of the flow of the exhaust gas. For instance, the substrate is formed of cordierite and has a honeycomb structure. The oxidation catalyst in the embodiment has a HC adsorption layer, for adsorbing unburned fuel, that is formed on the surface of the substrate. The HC adsorption layer is formed, for instance, of a material that adsorbs unburned fuel, such as a zeolite or the like. An oxidation layer, made up of a porous oxide powder, is layered on the surface of the HC adsorption layer. The oxidation layer carries a noble metal catalyst, such as platinum Pt or the like.

The CO or HC in the exhaust gas is oxidized in the oxidation layer into substances such as water and carbon dioxide. The oxidation layer has an activation temperature at or above which oxidation reactions take place. HC become adsorbed onto the HC adsorption layer at low temperature. The adsorbed HC is released when the temperature of the HC adsorption layer rises up to a predetermined temperature. When the temperature of the oxidation catalyst-is low, the HC adsorption layer adsorbs HC, thereby removing the HC in the exhaust gas. Upon reaching a high temperature, the oxidation layer of the oxidation catalyst becomes activated, whereupon the adsorbed HC is released from the HC adsorption layer and is oxidized by the noble metal catalyst of the oxidation layer.

In the embodiment, flame is generated by the flame generating unit upstream of the oxidation catalyst. The temperature of the oxidation catalyst can be raised quickly due to the arrival, to the upstream end face of the oxidation catalyst, of flame that is generated upstream of the oxidation catalyst. The temperature of the oxidation catalyst can be raised thus quickly when the temperature is below the activation temperature. Once the oxidation catalyst is at or above the activation temperature, the oxidation reactions become further activated as the temperature of the oxidation catalyst increases. The oxidizing Power of the oxidation catalyst can be enhanced by raising the temperature of the oxidation catalyst. Moreover, the oxidation reactions in the oxidation catalyst cause reaction heat. The temperature, of the oxidation catalyst can be raised yet faster due to such reaction heat.

In the embodiment, unburned fuel is caused to adhere to the upstream end of the oxidation catalyst, before flame generation, and then flame is generated in such a manner that the flame reaches the oxidation catalyst. The active substances in the flame are supplied to the oxidation catalyst, while combustion of the unburned fuel adhered to the end of the oxidation catalyst gives rise also to active substances that can be supplied to the oxidation catalyst.

The active substances include substances that have high oxidizing power and that, as a result, allow triggering oxidation reactions at a lower temperature than the activation temperature in a case where no active substances are supplied. Specifically, the active substances allow lowering the temperature at which the oxidation catalyst is activated, and allow raising the temperature of the oxidation catalyst in a short time. When another exhaust treatment device 55 that requires a rise in temperature is disposed downstream of the oxidation catalyst, the active substances allow also the temperature of this other exhaust treatment device 55 to rise quickly. When for instance a particulate filter is disposed downstream of the exhaust treatment device 55, the temperature of the particulate filter can be raised in a short time, in order to burn away the particulate matter that is deposited on the particulate filter.

The oxidation catalyst of the embodiment has HC adsorption ability. Imparting HC adsorption ability to the exhaust treatment device 55 allows more unburned fuel to be adhered to the exhaust treatment device 55, and allows reducing the amount of unburned fuel that gets past the exhaust treatment device 55. The exhaust purification device is provided with a temperature detection unit that detects the temperature of the oxidation catalyst. With reference to FIG. 1, the temperature detection unit of the embodiment has the first temperature sensor 26 that is disposed downstream of the exhaust treatment device 55 having an oxidation catalyst. The temperature of the oxidation catalyst can be detected by way of the first temperature sensor 26.

Control is performed in the embodiment such that the amount of unburned fuel adhered to the oxidation catalyst reduces, as the temperature of the oxidation catalyst is high. Specifically, control is carried out such that the amount of unburned fuel supplied by the fuel addition valve 15 reduces, as the temperature of the oxidation catalyst is high. A lower temperature in the HC adsorption layer entails greater unburned fuel adsorption, while the adsorption amount of unburned fuel decreases with rising temperature. Therefore, control is carried out in such a way so as to reduce the amount of adhered unburned fuel when the temperature of the oxidation catalyst is high.

The electronic control unit 30 may have stored therein a supply amount of fuel by the fuel addition valve 15 for causing unburned fuel to adhere to an end of the oxidation catalyst, for instance, in the form of a mapping function that associates the supply amount with the temperature of the oxidation catalyst. After detection of the temperature of the oxidation catalyst, the supply amount of unburned fuel can be selected based on the above map. Alternatively, there is set beforehand an oxidation catalyst criterion temperature for the preliminary supply of unburned fuel, such that a predetermined small amount of unburned fuel is supplied for temperatures higher than the criterion temperature. At temperatures at or below the criterion temperature, there can be supplied more unburned fuel than the above-mentioned predetermined small amount. Herein, the temperature at which the HC adsorption layer releases the adsorbed unburned fuel may be used as the criterion temperature. The criterion temperature used can be a temperature within a range from 250° C. to 300° C. The above control allows Preventing that the unburned fuel that is supplied to become adhered to the oxidation catalyst should slip through the oxidation catalyst.

The exhaust purification device of the embodiment has an adhesion amount detection unit that detects the amount of unburned fuel adhered to the oxidation catalyst. The amount of unburned fuel adhered to the oxidation catalyst can be calculated, for instance, based on a mapping function that associates the temperature of the oxidation catalyst and the amount of unburned fuel supplied by the fuel addition valve 15. Alternatively, the HC gas discharge amount from the engine body 1 during low-temperature operation of the internal combustion engine is calculated from a map. The air-fuel ratio sensor 56 is disposed downstream of the oxidation catalyst, to detect thereby the amount of HC outflow from the oxidation catalyst. The HC adsorption amount in the oxidation catalyst can be detected by subtracting the amount of HC flowing out of the oxidation catalyst from the amount of HC discharged from the engine body 1.

In the exhaust purification device of the embodiment, high-temperature flame reaches the oxidation catalyst simultaneously with ignition. When the amount of unburned fuel adhered to the oxidation catalyst is equal to or greater than a predetermined amount, therefore, a large amount of unburned fuel might desorb suddenly, upon combustion, and slip through the oxidation catalyst.

In the embodiment, therefore, control is performed so as to lower flame temperature, as the amount of unburned fuel adhered to the oxidation catalyst is greater. The amount of unburned fuel adhered to the oxidation catalyst can be detected by the adhesion amount detection unit. When the amount of unburned fuel adhered to the oxidation catalyst is small, there is surplus HC adsorption ability. This allows preventing that a substantial amount of unburned fuel should desorb suddenly, even at a high flame temperature. When the amount of unburned fuel adhered to the oxidation catalyst is substantial, there is little surplus HC adsorption ability. Therefore, the flame temperature is lowered, to suppress thereby desorption of unburned fuel in a significant amount.

For instance, control is performed in such a manner that, when the detected amount of unburned fuel adhered to the oxidation catalyst is equal to or greater than a criterion value, the flame temperature becomes lower than a predetermined temperature. Control can also be performed in such a manner that the flame temperature becomes equal to or higher than a predetermined temperature when the amount of unburned fuel adhered to the oxidation catalyst is smaller than the criterion value. The flame temperature can be controlled by adjusting the amount of fuel that is supplied by the fuel addition valve upon flame generation, as described above. When the amount of adhered unburned fuel is large, for instance, the flame temperature can be lowered by reducing the amount of fuel supplied by the fuel addition valve 15.

An explanation follows next on an instance where the exhaust treatment device 55 of FIG. 1 has a particulate filter. The particulate filter is a filter that removes particulate matter (particulates) that is in the exhaust gas, such as carbon microparticles, or ionic microparticles such as sulfates or the like. The particulate filter has, for instance, a honeycomb structure in which a plurality of flow channels extends in the direction of gas flow. The plurality of flow channels includes flow channels having a sealed downstream end, alternately formed with flow channels having a sealed upstream end. The walls that partition the flow channels are formed of a porous material such as cordierite. Particulates are trapped as the exhaust gas passes through these partition walls.

Particulate matter deposits on the particulate filter as a result of continued operation. The amount of particulate matter that deposits on the particulate filter per unit time can be determined based on a map of a function that associates engine speed and the amount of fuel injected to the combustion chambers 2. The deposition amount of particulate matter at any time can be calculated by integrating the amount of particulate matter deposited per unit time as obtained based on the above map. It is thus possible to determine whether the amount of particulate matter exceeds or not an allowable value. Alternatively, there is disposed a differential pressure sensor that detects the pressure difference before and after the particulate filter, so that an excess of particulate matter deposited on the particulate filter beyond the allowable value can be determined when the before-after pressure difference detected by the differential pressure sensor exceeds an allowable value.

When the deposition amount of particulate matter exceeds an allowable value, the particulate filter is regenerated through oxidative removal of the deposited particulate matter. To regenerate the particulate filter, the air-fuel ratio of the exhaust gas is made leaner, the temperature of the particulate filter is raised up to the regeneration temperature, and the deposited particulate matter is removed through oxidation.

In the embodiment, unburned fuel is adhered beforehand to the upstream end of the particulate filter. Thereafter, flame is generated in such a way so as to reach the upstream end of the particulate filter. The temperature of the particulate filter can be raised quickly due to the flame that reaches the particulate filter.

Also, significant amounts of active substances can be supplied to the particulate filter. The active substances include substances that have high oxidizing power and that, as a result, allow triggering oxidation reactions at a lower temperature than the regeneration temperature in a case where no active substances are supplied. In particular, OH, radicals and O radicals, which are active substances, have the effect of lowering the temperature at which the particulate matter burns. As a result, the particulate filter can be regenerated in a short time, or a greater amount of particulate matter can be removed if the particulate filter is regenerated over the same lapse of time, so that the intervals between particulate filter regenerations can be prolonged.

The regeneration time of the particulate filter or the intervals between particulate filter regenerations can be selected on the basis of, for instance, the number of flame generations, the time of flame generation, or the temperature history of the particulate filter.

When another exhaust treatment device 55 that requires rising temperature is disposed downstream of the particulate filter, particulate matter can be removed by raising the temperature of the particulate filter to or beyond the temperature at which the particulate matter burns. The combustion heat of the particulate matter can be exploited in to raise the temperature of the downstream exhaust treatment device 55. As a result, the temperature of the downstream exhaust treatment device 55 can be raised in a short time.

An explanation follows next on an instance where the exhaust treatment device 55 of FIG. 1 has a $NO_x$ selective reducing catalyst (SCR: selective catalytic reduction). Herein, a reducing agent supply unit for supplying urea or ammonia is disposed in the exhaust passage upstream of the $NO_x$ selective reducing catalyst. In the embodiment, there is disposed a urea supply valve for supplying aqueous urea. The reducing agent supply unit may also be formed so as to supply aqueous ammonia.

The $NO_x$ selective reducing catalyst is a catalyst that can selectively reduce $NO_x$ using ammonia as a reducing agent. As the $NO_x$ selective reducing catalyst there can be used, for instance, a catalyst that carries a noble metal such as Pt on the surface of a substrate of zeolite, alumina or the like. The catalyst used may also be, for instance, a substrate that the surface whereof is caused to support a transition metal, such as Cu or the like, through ion exchange.

The urea supply valve supplies urea into the exhaust gas that flows through the exhaust passage, whereupon ammonia is generated, out of the urea. In the $NO_x$ selective reducing catalyst, the $NO_x$ in the exhaust gas is selectively reduced into nitrogen through supply of the generated ammonia to the $NO_x$ selective reducing catalyst.

The selective $NO_x$ reducing action of the $NO_x$ selective reducing catalyst is not brought out unless the temperature is at or above a predetermined temperature. That is, the $NO_x$ selective reducing catalyst has an activation temperature. The temperature of the $NO_x$ selective reducing catalyst can be raised to or above the activation temperature, in a short time, by causing unburned fuel to adhere of the $NO_x$ selective reducing catalyst before flame generation, and then generating a flame in such a manner that the flame reaches the upstream end of the $NO_x$ selective reducing catalyst.

The explanation in the embodiment has focused on an instance where a single exhaust treatment device 55 is provided. However, a further exhaust treatment device may be disposed downstream of the exhaust treatment device 55 that is reached by the flame. For instance, a particulate filter and a $NO_x$ storage-reduction catalyst may be disposed downstream of an oxidation catalyst that is reached by the flame.

Other features, effects and results are identical to those of Embodiment 1, and a recurrent explanation thereof will be omitted.

An explanation follows next on an exhaust purification device of an internal combustion engine according to Embodiment 3, with reference to FIGS. 13 to 18. In the exhaust purification device of the internal combustion engine of the embodiment, an exhaust treatment device 17 to which a flame arrives is a $NO_x$ storage catalyst.

Figure 13:
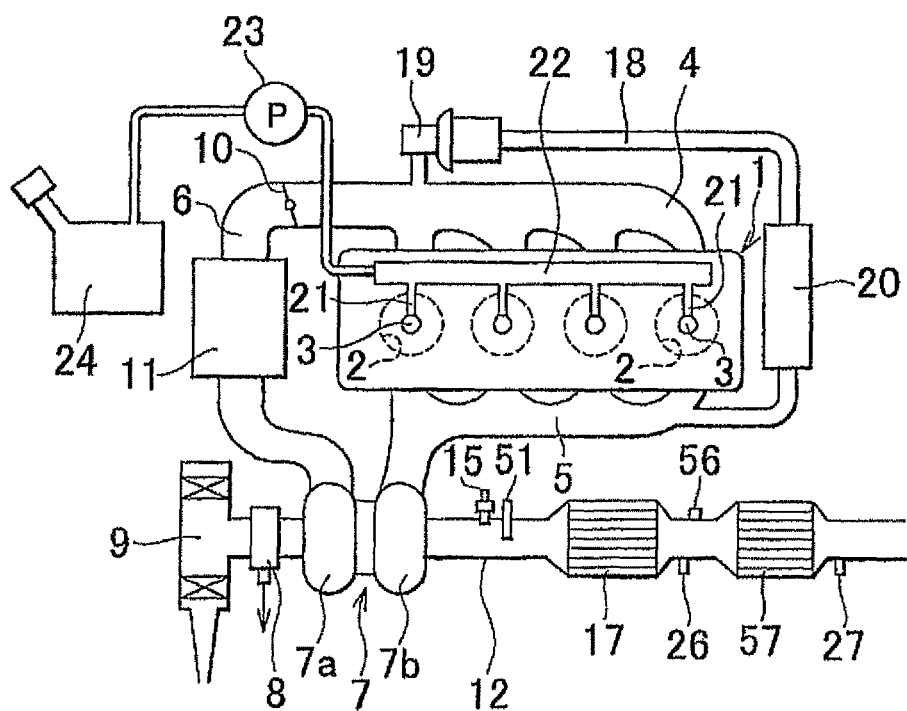
FIG. 13 is a schematic diagram of an exhaust purification device of an internal combustion engine in Embodiment 3.

FIG. 13 is a schematic diagram of the internal combustion engine of the embodiment. The exhaust purification device of the internal combustion engine of the embodiment has a $NO_x$ storage catalyst 17, as the exhaust treatment device 17 to which a flame arrives, disposed downstream of the glow plug 51. A $SO_x$ adsorption catalyst 57 is disposed downstream of the $NO_x$ storage catalyst 17.

The first temperature sensor 26 for detecting the temperature of the $NO_x$ storage catalyst 17 is disposed downstream of the $NO_x$ storage catalyst 17. The air-fuel ratio sensor 56 is also disposed downstream of the $NO_x$ storage catalyst 17. A second temperature sensor 27 for detecting the temperature of the $SO_x$ adsorption catalyst 57 is disposed downstream of the $SO_x$ adsorption catalyst 57. The output signals of the first temperature sensor 26, the second temperature sensor 27 and the air-fuel ratio sensor 56 are input into the input port 35 of the electronic control unit 30, via corresponding A/D converters 37 (FIG. 1).

The NOx storage catalyst (NSR) 17 has a catalyst carrier, for instance made up of alumina, supported on a substrate. A noble metal catalyst is distributedly supported on the surface of the catalyst carrier. A layer of a $NO_x$ absorbent is formed on the surface of the catalyst carrier. The noble metal catalyst used is, for instance, platinum Pt. The components used for making up the $NO_x$ absorbent may be at least one component selected from among alkaline metals such as potassium K, sodium Na or cesium Cs; alkaline earth metals such as barium Ba or calcium Ca, or rare earths such as lanthanum La or yttrium Y.

The $NO_x$ storage catalyst 17 stores temporarily $NO_x$ contained in the exhaust gas discharged from the engine body 1, and releases of the stored $NO_x$ converts the $NO_x$ into $N_2$ when the stored $NO_x$ is released. The $NO_x$ storage catalyst 17 stores $NO_x$ when the air-fuel ratio in the exhaust gas is lean. When the $NO_x$ stored amount reaches an allowable value, the stored $NO_x$ is released by bringing the air-fuel ratio in the exhaust gas to a rich or stoichiometric air-fuel ratio. Reducing agents such as unburned fuel or the like are present in substantial amounts in the exhaust gas when the air-fuel ratio of the exhaust gas is a rich or stoichiometric air-fuel ratio, as a result of which the released $NO_x$ can be reduced into $N_2$. $NO_x$ release control is thus carried out in the above manner.

The exhaust gas of the internal combustion engine may contain sulfur oxides ($SO_x$). In such cases, the $NO_x$ storage catalyst 17 stores $SO_x$ at the same time that it stores $NO_x$. $SO_x$ storage detracts from the amount of $NO_x$ that can be stored. Also, the $NO_x$ storage catalyst 17 suffers so-called sulfur poisoning. Sulfur poisoning recovery, in which $SO_x$ is released, is performed to eliminate sulfur poisoning. $SO_x$ is stored in the $NO_x$ storage catalyst 17 more stably than $NO_x$. In sulfur poisoning recovery, therefore, the $NO_x$ storage catalyst 17 is brought to a high temperature, and, in that high-temperature state, the air-fuel ratio of the exhaust gas is brought to a rich or stoichiometric air-fuel ratio, to elicit thereby $SO_x$ release. $SO_x$ release control is thus carried out in the above manner.

During the rise in temperature for $SO_x$ release control in the embodiment, preliminary fuel supply by the fuel addition valve 15 is performed before the flame reaches the $NO_x$ storage catalyst 17, to cause unburned fuel to adhere to the upstream end of the $NO_x$ storage catalyst 17. Thereafter, flame is generated through supply of unburned fuel by the fuel addition valve 15 and through energization of the glow plug 51, and the flame reaches the upstream end of the $NO_x$ storage catalyst 17. Arrival of the flame to the $NO_x$ storage catalyst 17 allows the temperature of the $NO_x$ storage catalyst 17 to rise quickly.

The $NO_x$ storage catalyst 17 supports an oxidation catalyst for oxidizing $NO_x$ during the $NO_x$ storage process. The heat of the oxidation reactions that take place as a result in the $NO_x$ storage catalyst 17 allow the temperature of the $NO_x$ storage catalyst 17 to rise yet faster. In particular, large amounts of active substances can be supplied to the $NO_x$ storage catalyst 17 by causing unburned fuel to become adhered to the upstream end prior to flame generation. Oxidation reactions of the active substances allow the temperature of the $NO_x$ storage catalyst 17 to rise quickly.

An explanation follows next on enrichment control, wherein the air-fuel ratio of the exhaust gas is enriched during $NO_x$ release control and $SO_x$ release control of the $NO_x$ storage catalyst 17. In the embodiment, the air-fuel ratio of the exhaust gas is controlled to be highly enriched. Reduction efficiency can be enhanced by controlling the air-fuel ratio of the exhaust gas to be highly rich.

Figure 14:
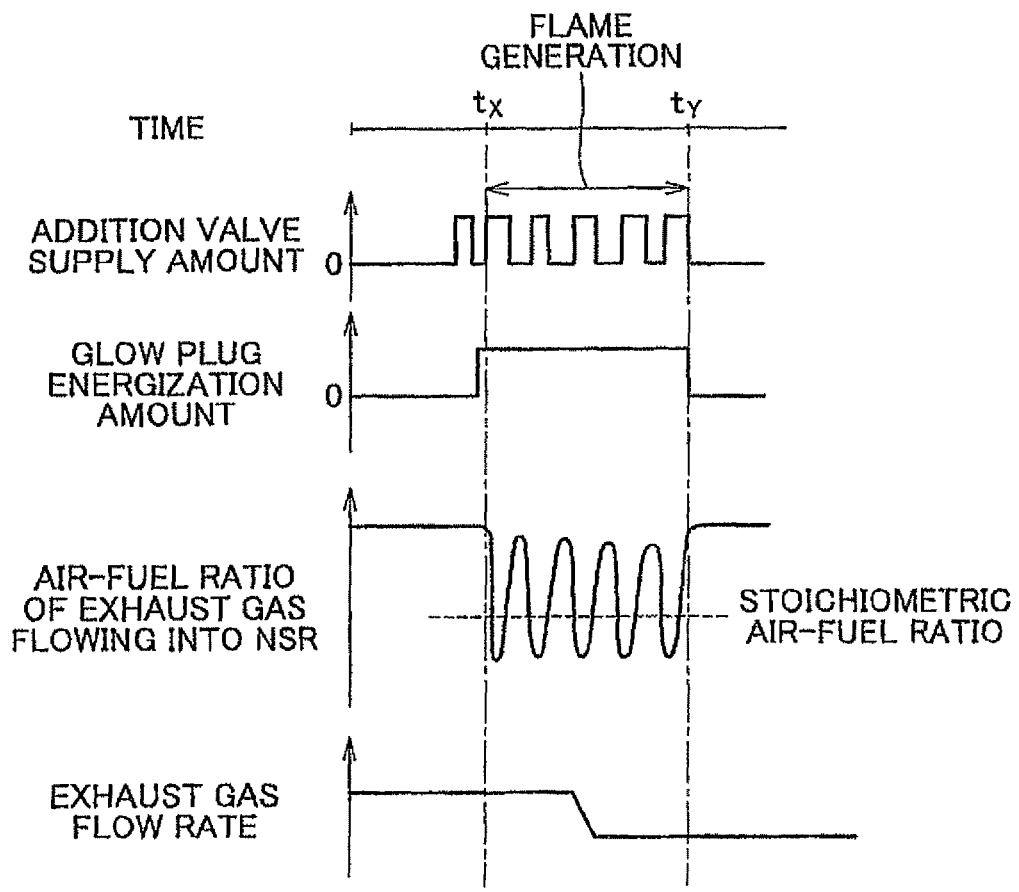
FIG. 14 is a time chart of a first operation control in Embodiment 3.

FIG. 14 illustrates a time chart of a first operation control of the exhaust purification device of the internal combustion engine of the embodiment. FIG. 14 is a time chart of $NO_x$ release control in the embodiment. The explanation below deals mainly with $NO_x$ release control, although the air-fuel ratio in the exhaust gas can be enriched also by controlling $SO_x$ release in the same way as in $NO_x$ release.

Unburned fuel is caused to adhere to the upstream end of the $NO_x$ storage catalyst 17 through preliminary fuel supply by the fuel addition valve 15. Thereafter, flame is generated at time $t_X$. In the embodiment, the air-fuel ratio in the exhaust gas that flows into the $NO_x$ storage catalyst 17 is enriched at the same time that flame is generated. In the embodiment, the air-fuel ratio of the exhaust gas is enriched through intermittent supply of the unburned fuel. Flame can be generated a plurality of times through supply of unburned fuel over a corresponding number of times.

In the embodiment, the active substances in the flame can be supplied to the $NO_x$ storage catalyst 17. A large amount of active substances can be supplied to the $NO_x$ storage catalyst 17 through combustion, elicited by the flame, of the unburned fuel adhered to the upstream end of the $NO_x$ storage catalyst 17. The active substances contain reducing agents of high reducing power, and hence the active substances have excellent $NO_x$ releasing and $NO_x$ reducing performance. Thus, a greater amount of $NO_x$ can be released and reduced, in a same lapse of time, as compared with a case in which the exhaust gas that flows into the $NO_x$ storage catalyst 17 contains no active substances.

Figure 15:
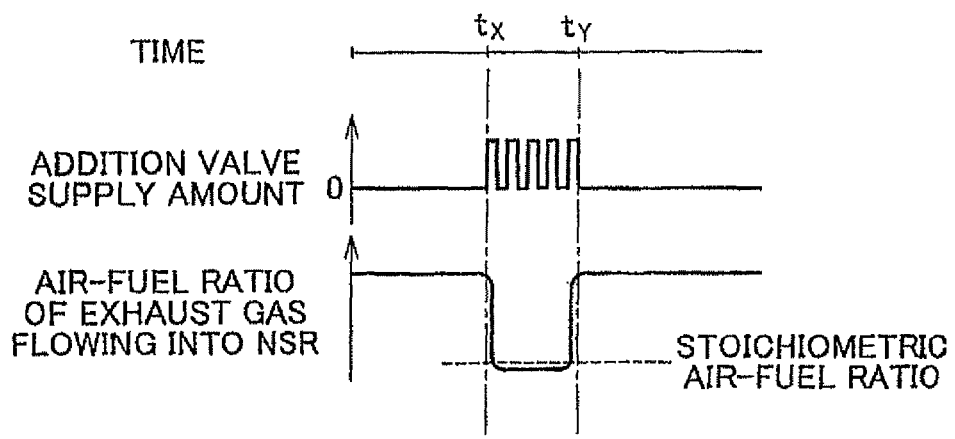
FIG. 15 is a time chart of a second operation control, as a comparative example, in Embodiment 3.

FIG. 15 illustrates a time chart of a second operation control during $NO_x$ release control in the embodiment. FIG. 15 is a time chart of a comparative example. The exhaust purification device of the internal combustion engine of the comparative example has the fuel addition valve 15 but no glow plug 51. In the comparative example, thus, the air-fuel ratio of the exhaust gas that flows into the $NO_x$ storage catalyst 17 is enriched through supply of unburned fuel by the fuel addition valve 15, but without flame generation.

During $NO_x$ release control or $SO_x$ release control in the exhaust purification device of the comparative example, unburned fuel is supplied in such a way so as to bring the air fuel ratio of the exhaust gas that flows into the $NO_x$ storage catalyst to the stoichiometric air-fuel ratio or to be slightly richer than the stoichiometric air-fuel ratio. Although fuel is supplied intermittently by the fuel addition valve 15, the air-fuel ratio of the exhaust gas that flows into the $NO_x$ storage catalyst 17 is made homogeneous, for instance, by the unburned fuel adhered to the wall face of the exhaust pipe 12. That is, the air-fuel ratio of the exhaust gas flowing into the $NO_x$ storage catalyst 17 is substantially constant.

In the first operation control illustrated in FIG. 14, by contrast, highly reducing active substances can be supplied to the $NO_x$ storage catalyst 17, and hence the air-fuel ratio of the exhaust gas that flows into the $NO_x$ storage catalyst 17 can be highly enriched. Herein, fuel is supplied in such a manner that the air-fuel ratio of the exhaust gas is highly enriched, which might result in an greater amount of unburned fuel that gets past the $NO_x$ storage catalyst 17. In the first operation control, the interval between supplies of unburned fuel by the fuel addition valve 15 is lengthened in order to suppress slip-through of the unburned fuel past the $NO_x$ storage catalyst 17. That is, the time during which unburned fuel supply is discontinued is extended. As a result, the air-fuel ratio of the exhaust gas that flows into the $NO_x$ storage catalyst 17 is enriched intermittently. Alternatively, there are interposed periods during which the air-fuel ratio of the exhaust gas that flows into the $NO_x$ storage catalyst 17 is lean. The above control allows highly enriching the air-fuel ratio of the exhaust gas while suppressing slip-through of unburned fuel past the $NO_x$ storage catalyst.

In the explanation of the example illustrated in FIG. 14, $NO_x$ release control is performed once, but may be performed a number of times, depending on the amount of $NO_x$ and/or $SO_x$ to be released. In the explanation of the above example, the air-fuel ratio of the exhaust gas is controlled so as to be highly enriched, but the embodiment is not limited thereto, and the air-fuel ratio of the exhaust gas may also be brought to the stoichiometric air-fuel ratio or may be enriched slightly beyond the stoichiometric air-fuel ratio.

In the first operation control, the flow rate of the exhaust gas is reduced during the period of intermittent flame generation. The flow rate of the exhaust gas can be lowered by reducing the amount of intake air that flows into the engine body 1. A lower flow rate allows flame to spread within the exhaust passage and makes thus for better combustibility. This allows prolonging the reaction time in the $NO_x$ storage catalyst 17, and enhancing reactivity in the $NO_x$ storage catalyst 17. The reducing power of the unburned fuel and the like adhered to the $NO_x$ storage catalyst 17 is enhanced also through activation by radicals. The active substances allow thus improving the $NO_x$ reduction performance.

Oxygen concentration during combustion of the unburned fuel can be lowered by lowering the flow rate of the exhaust gas, residual oxygen in the flame can also be lowered thereby, so that a flame substantially depleted of oxygen can be supplied to the $NO_x$ storage catalyst 17. As a result, reducing agents having yet higher reducing power can be supplied to the $NO_x$ storage catalyst 17, whereby the $NO_x$ reduction performance of the $NO_x$ storage catalyst 17 can be further enhanced. The oxygen concentration is lowered in the embodiment by reducing the flow rate of exhaust gas. However, the embodiment is not limited thereto, and the oxygen concentration in the exhaust gas may be lowered in any other way.

In the example illustrated in FIG. 14, the oxygen concentration in the exhaust gas is lowered during the period of flame generation, but the above operation control is not limited thereto, and may be performed so as to lower the oxygen concentration in the exhaust gas before flame generation. Also, the flow rate of the exhaust gas may be brought to zero when reducing, the flow rate of exhaust gas during the period of flame generation. The flow rate of exhaust gas can be brought to zero for instance by stopping the engine body 1. In a case where the internal combustion engine is installed in an automobile, the engine body 1 can be stopped when the automobile stops. Alternatively, the engine body 1 can be stopped under predetermined operation conditions in the case of a hybrid automobile or the like that is provided with a drive motor in addition to the engine body 1.

Figure 16:
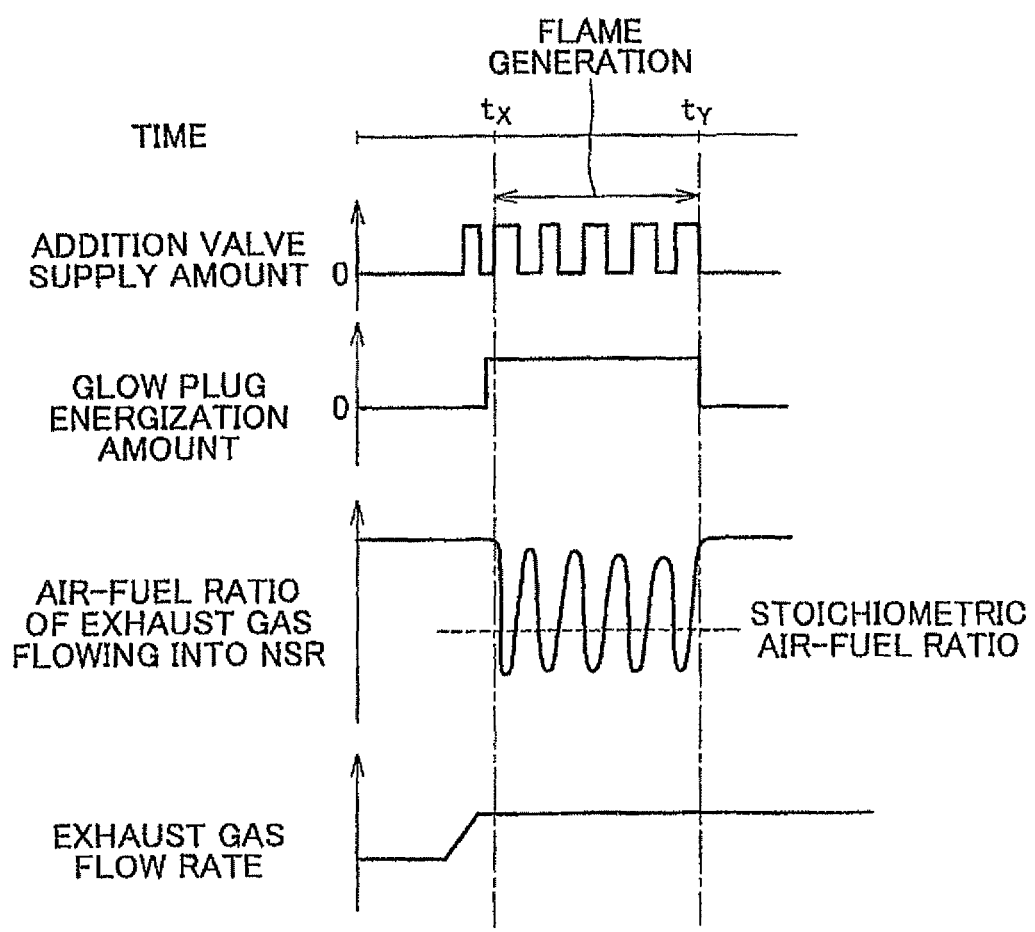
FIG. 16 is a time chart of a third operation control in Embodiment 3.

FIG. 16 illustrates a time chart of a third operation control of the exhaust purification device of the internal combustion engine of the embodiment In the third operation control, $NO_x$ release control is performed so as to increase the flow rate of exhaust gas before flame generation. Control is performed so as to increase the flow rate of exhaust gas flowing out of the engine body 1. In the embodiment, the amount of intake air flowing into the engine body 1 is increased. An increase in the flow rate of exhaust gas results in a greater oxygen concentration in the exhaust gas. The increased oxygen concentration allows increasing the combustibility of the unburned fuel during flame generation. This allows increasing the amount of active substances such as radicals or the like that are generated by the flame, and allows increasing, as a result, the $NO_x$ release and $NO_x$ reduction performance of the $NO_x$ storage catalyst 17.

In the third operation control, the oxygen concentration in the exhaust gas is raised before flame generation, but the operation control is not limited thereto, and may be performed so as to raise the oxygen concentration during the period of flame generation. Oxygen concentration is raised in the embodiment by increasing the flow rate of exhaust gas, but the embodiment is not limited thereto, and oxygen concentration may be increased by performing control in any other way.

Figure 17:
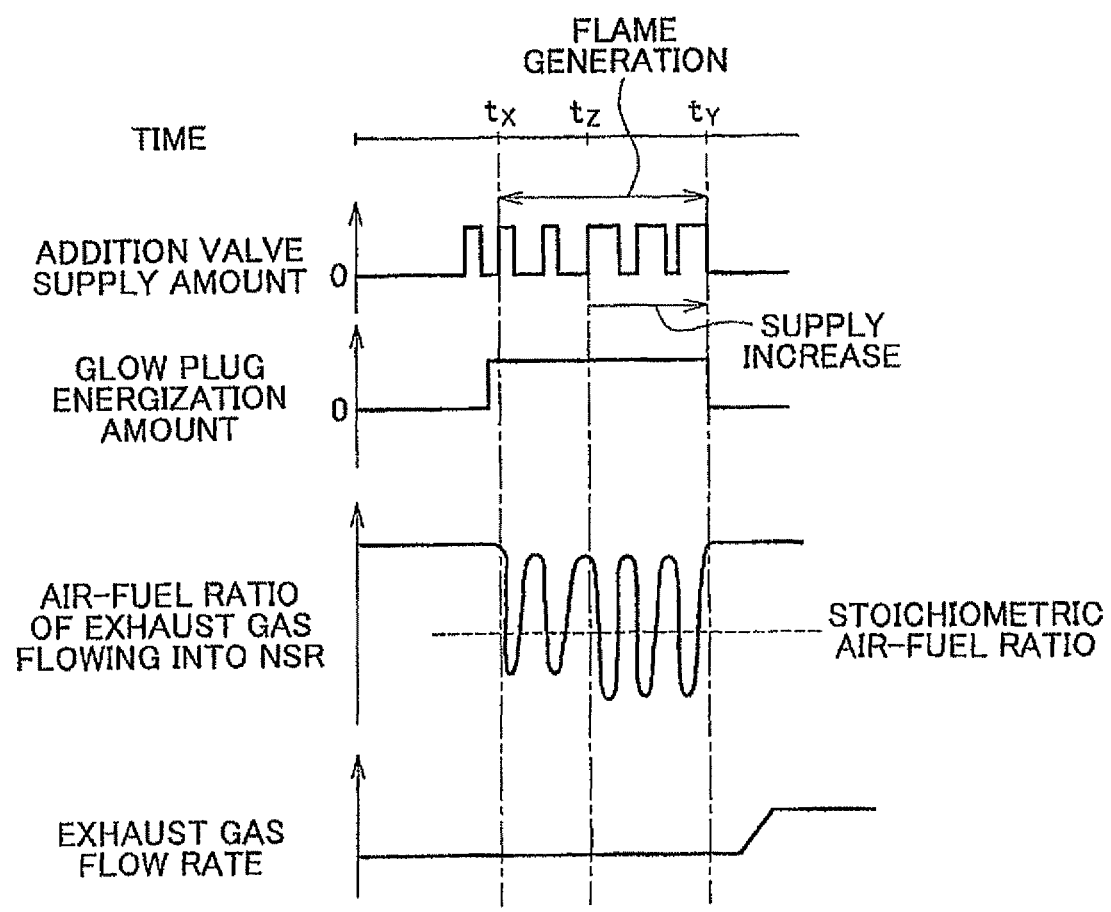
FIG. 17 is a time chart of a fourth operation control in Embodiment 3.

FIG. 17 illustrates a time chart of a fourth operation control of the exhaust purification device of the internal combustion engine of the embodiment. The fourth operation control is identical to the first operation control of the embodiment in that, for $NO_x$ release control, flame is generated at time $t_x$, after preliminary supply of fuel by the fuel addition valve 15.

In the fourth operation control, control is performed in such a way so as to increase the amount of unburned fuel that is supplied by the fuel addition valve 15 during the period of flame generation. Specifically, the supply amount of unburned fuel by the fuel addition valve 15 is increased in any from a second and subsequent flame generations, from among the number of times that fuel is intermittently supplied by the fuel addition valve 15. In the fourth operation control, the supply amount by the fuel addition valve 15 is increased at time $t_z$. The temperature of the $NO_x$ storage catalyst 17 rises during the period of flame generation. The higher temperature of the $NO_x$ storage catalyst 17 enhances the $NO_x$ release and $NO_x$ reduction performance. The reaction amount can therefore be increased by increasing the amount of fuel supplied to the $NO_x$ storage catalyst 17.

In the embodiment, supply is increased by a given amount during the period of flame generation, and a constant amount is continuously supplied thereafter. However, the operation control is not limited thereto, and the supply amount of unburned fuel may be varied any number of times. Alternatively, the supply amount of unburned fuel may be increased gradually as the number of flame generations adds up.

In the fourth operation control, moreover, the air-fuel ratio of the exhaust gas is made leaner and the flow rate of the exhaust gas is increased once $NO_x$ release control is over, as compared with the air-fuel ratio and the flow rate of the exhaust gas when the $NO_x$ release control is executed. During $NO_x$ release control in the embodiment, the air-fuel ratio of the exhaust gas that flows into the $NO_x$ storage catalyst 17 is highly enriched. As a result, residual carbon monoxide and/or unburned fuel may remain in the $NO_x$ storage catalyst 17. These residues hamper storage of $NO_x$ during ordinary operation after $NO_x$ release control.

For instance, carbon monoxide may remain adhered to the surface of the noble metal. After $NO_x$ release control, the amount of oxygen flowing into the $NO_x$ storage catalyst 17 can be increased by increasing the flow rate of the exhaust gas. The residual carbon monoxide and/or Unburned fuel in the $NO_x$ storage catalyst 17 can be oxidized and removed thereby. This allows enhancing, as a result, the $NO_x$ storage capacity of the $NO_x$ storage catalyst 17. The air-fuel ratio of the exhaust gas is made leaner and the flow rate of the exhaust gas is increased in the same way also after $SO_x$ release control, whereby residual carbon monoxide and the like in the $NO_x$ storage catalyst 17 can be removed.

The exhaust purification device of the internal combustion engine of the embodiment has an active substance detection unit that detects the amount of active substances generated by the flame. As illustrated in FIG. 13, the active substance detection unit of the embodiment has the first temperature sensor 26 disposed downstream of the $NO_x$ storage catalyst 17. The amount of active substances is stored in the electronic control unit 30 as a function of the temperature of the $NO_x$ storage catalyst 17. The active substance amount can be calculated by detecting the temperature of the $NO_x$ storage catalyst 17.

In the embodiment, the number of times that the air-fuel ratio of the exhaust gas is enriched is selected by detecting the amount of active substances that are detected by the active substance detection unit. In the embodiment, supplementary $NO_x$ release control or $SO_x$ release control is performed when the active substance amount detected by the active substance detection unit is no greater than a criterion value. When the active substance amount is equal to or less than a criterion value, the number of flame generations for $NO_x$ release control or $SO_x$ release control is increased, as compared with when the active substance amount is greater than the criterion value. For instance, control can be performed in such a manner that when the active substance amount is equal to less than the criterion value during $NO_x$ release control, it is determined that the release amount of $NO_x$ from the $NO_x$ storage catalyst is insufficient, whereupon the air-fuel ratio of the exhaust gas is enriched, accompanied by supplementary flame generation.

During $SO_x$ release control in which $SO_x$ is released from the $NO_x$ storage catalyst 17, the temperature of the $NO_x$ storage catalyst 17 must be raised up to a temperature that enables $SO_x$ release. The $SO_x$ release temperature is, for instance, 600° C. in a case where no flame-derived active substances are supplied to the $NO_x$ storage catalyst 17. In $SO_x$ release control, the temperature, is raised to or above the $SO_x$ release temperature, and the air-fuel ratio of the exhaust gas is brought to the stoichiometric air-fuel ratio or is enriched. The $SO_x$ stored in the $NO_x$ storage catalyst 17, migrates in the upstream-downstream direction within the $NO_x$ storage catalyst 17. The $SO_x$ is discharged in the order it reaches the downstream end of the $NO_x$ storage catalyst 17. Therefore, a predetermined time must elapse until discharge of the $SO_x$ stored in the upstream portion of the $NO_x$ storage catalyst 17.

In the embodiment, supply of active substances to $NO_x$ storage catalyst 17 allows lowering the temperature at which $SO_x$ can be released. The active $SO_x$ release temperature, which is the release temperature upon supply of active substances to the $NO_x$ storage catalyst 17, is for instance 450° C. The temperature at the upstream end of the $NO_x$ storage catalyst 17 can be brought to or above the active $SO_x$ release temperature during $NO_x$ release control in the embodiment. For instance, the temperature at the upstream end of the $NO_x$ storage catalyst 17 during flame generation is brought to or above the active $SO_x$ release temperature by adjusting the supply amount of unburned fuel by the fuel addition valve 15 and/or by adjusting the position of the glow plug 51. In case that the temperature at the upstream end of the $NO_x$ storage catalyst 17 does not reach the active $SO_x$ release temperature, the temperature may be raised, for instance, through supplementary flame generation.

Figure 18:
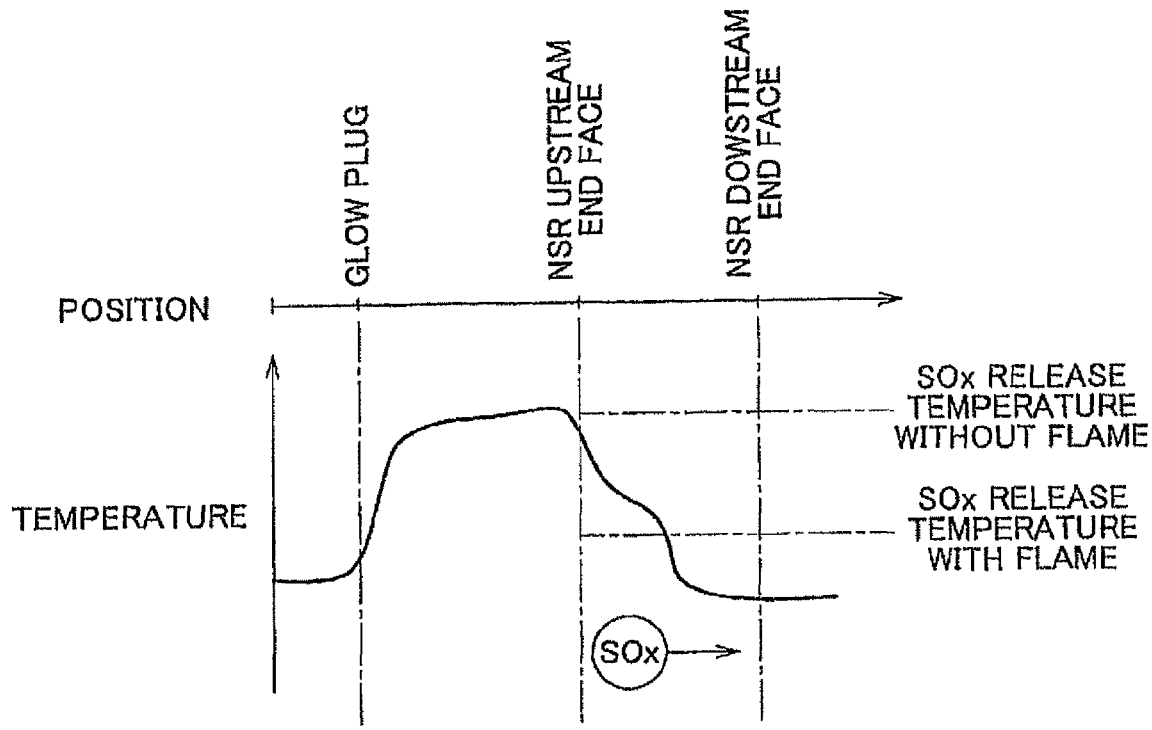
FIG. 18 is a graph explaining a temperature distribution in a $NO_x$ storage catalyst of Embodiment 3 during $NO_x$ release control.

FIG. 18 is a graph for explaining the temperature distribution in the $NO_x$ storage catalyst 17 during $NO_x$ release control. The X-axis represents position from the glow plug 51 to the downstream end of the $NO_x$ storage catalyst 17. The temperature of the exhaust gas rises on account of flame generation by the glow plug 51. The temperature in the $NO_x$ storage catalyst 17 is highest at the upstream end thereof. The temperature of the $NO_x$ storage catalyst 17 decreases towards the downstream end of the $NO_x$ storage catalyst 17. In the embodiment, the temperature at the upstream end of the $NO_x$ storage catalyst 17 is equal to or higher than the active $SO_x$ release temperature. Therefore, the $SO_x$ stored at the upstream portion of the $NO_x$ storage catalyst 17 migrates downstream.

$SO_x$ at the upstream end of the $NO_x$ storage catalyst 17 can be caused to migrate downstream during $NO_x$ release control. This allows shortening the time of downstream migration of $SO_x$ during $SO_x$ release control. $SO_x$ release control can thus be carried out in a short time, as there decreases the storage amount of $SO_x$ at the upstream portion of the $NO_x$ storage catalyst 17. During warm-up, for instance during startup of the internal combustion engine, the temperature rises from the upstream end side of the $NO_x$ storage catalyst 17. Therefore, $NO_x$ can be stored beginning from the upstream end of the $NO_x$ storage catalyst 17, where the storage amount of $SO_x$ is small. Storage of $NO_x$ can begin thus in a short time.

In the embodiment, the $SO_x$ adsorption catalyst 57 for trapping $SO_x$ is disposed downstream of the $NO_x$ storage catalyst 17, as illustrated in FIG. 13. As the $SO_x$ adsorption catalyst 57, there can be used a catalyst that removes $SO_x$ from exhaust gas by storing the $SO_x$ contained in the exhaust gas.

The $SO_x$ adsorption catalyst 57, for instance, may have a catalyst carrier, made up of, alumina or silica, on a substrate, with a noble metal catalyst distributedly supported on the surface of the catalyst carrier. A layer of $SO_x$ absorbent is formed on the surface of the catalyst carrier. Platinum Pt or the like can be used as the noble metal catalyst. The $SO_x$ absorbent contains a substance capable of forming sulfates.

Components that can be used to make up the $SO_x$ absorbent include, for instance, one or more metals from among alkaline metals, alkaline earth metals, rare earth metals and transition metals.

$SO_x$ releasability is enhanced by performing $SO_x$ release control by supplying active substances to the $NO_x$ storage catalyst 17, as described above. $SO_x$ is released thereby at a lower temperature than in conventional cases. In $SO_x$ release control, therefore, there is the possibility that the $SO_x$ stored in the $NO_x$ storage catalyst 17 may be released suddenly in significant amounts. In the embodiment, providing the $SO_x$ adsorption catalyst 57 downstream of the $NO_x$ storage catalyst 17 allows $SO_x$ to be temporarily stored in the $SO_x$ adsorption catalyst 57. This allows suppressing sudden release of significant amounts of $SO_x$.

$SO_x$ is difficult to trap by a $SO_x$ adsorption catalyst 57 in conventional technologies, even if the $SO_x$ adsorption catalyst 57 is disposed downstream of the $NO_x$ storage catalyst 17, since the temperature of both the $NO_x$ storage catalyst 17 and the $SO_x$ adsorption catalyst 57 increase during $SO_x$ release control. The $SO_x$ release temperature of the $NO_x$ storage catalyst 17 can be reduced in the embodiment. Therefore, the temperature of the $SO_x$ adsorption catalyst 57 can be prevented from exceeding the temperature at which $SO_x$ desorbs, $SO_x$ can be trapped thus in the $SO_x$ adsorption catalyst 57.

The $SO_x$ adhered to the $SO_x$ adsorption catalyst 57 can be released by raising the temperature of the exhaust gas. Alternatively, the $SO_x$ can be released by raising the temperature of the exhaust gas and enriching the air-fuel ratio of the exhaust gas. For instance, the temperature of the exhaust gas rises when the load of the internal combustion engine is high, and thus $SO_x$ can be released at such times.

The exhaust purification device of the internal combustion engine of the embodiment has a temperature detection unit that detects the temperature of the $SO_x$ adsorption catalyst 57. The temperature detection unit that detects the temperature of the $SO_x$ adsorption catalyst 57 includes the second temperature sensor 27. In the embodiment, flame generation by the flame generating unit is restricted when the temperature of the $SO_x$ adsorption catalyst 57 is lower than a criterion value. The $SO_x$ adsorption catalyst 57 has a temperature at which the $SO_x$ adsorption ability drops abruptly. For instance, the $SO_x$ adsorption ability drops when the temperature is lower than 350° C. This temperature can thus be taken as the criterion value.

In the embodiment, flame generation is restricted, to reduce thereby the amount of $SO_x$ flowing out of the $NO_x$ storage catalyst 17, when the temperature of the $SO_x$ adsorption catalyst 57 is lower than the criterion value. Upon control for enriching the air-fuel ratio of the exhaust gas, for instance, the air-fuel ratio of the exhaust gas is enriched but without flame generation. Alternatively, the interval between flame generations is lengthened, in the case of intermittent flame generation. In case $SO_x$ release control is already underway, $SO_x$ release control is discontinued temporarily. Performing control in the above-described ways allows preventing $SO_x$ from getting through the $SO_x$ adsorption catalyst 57 and being released into the atmosphere when the $SO_x$ adsorption ability of the $SO_x$ adsorption catalyst 57 is low.

Other features, effects and results are identical to those of Embodiment 1 or Embodiment 2, and a recurrent explanation thereof will be omitted.

Figure 19:
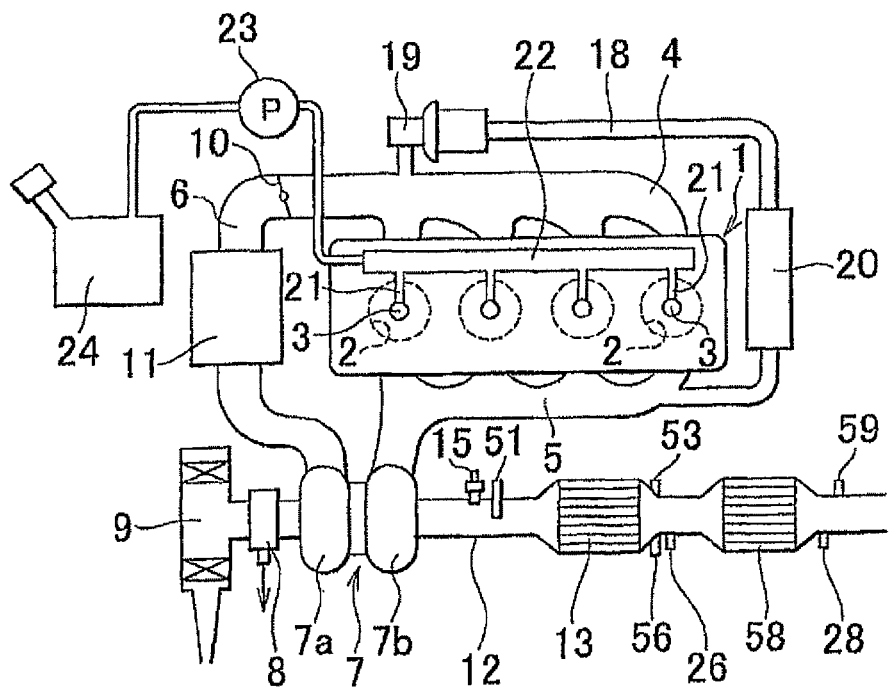
FIG. 19 is a schematic diagram of an internal combustion engine of Embodiment 4.
Figure 20:
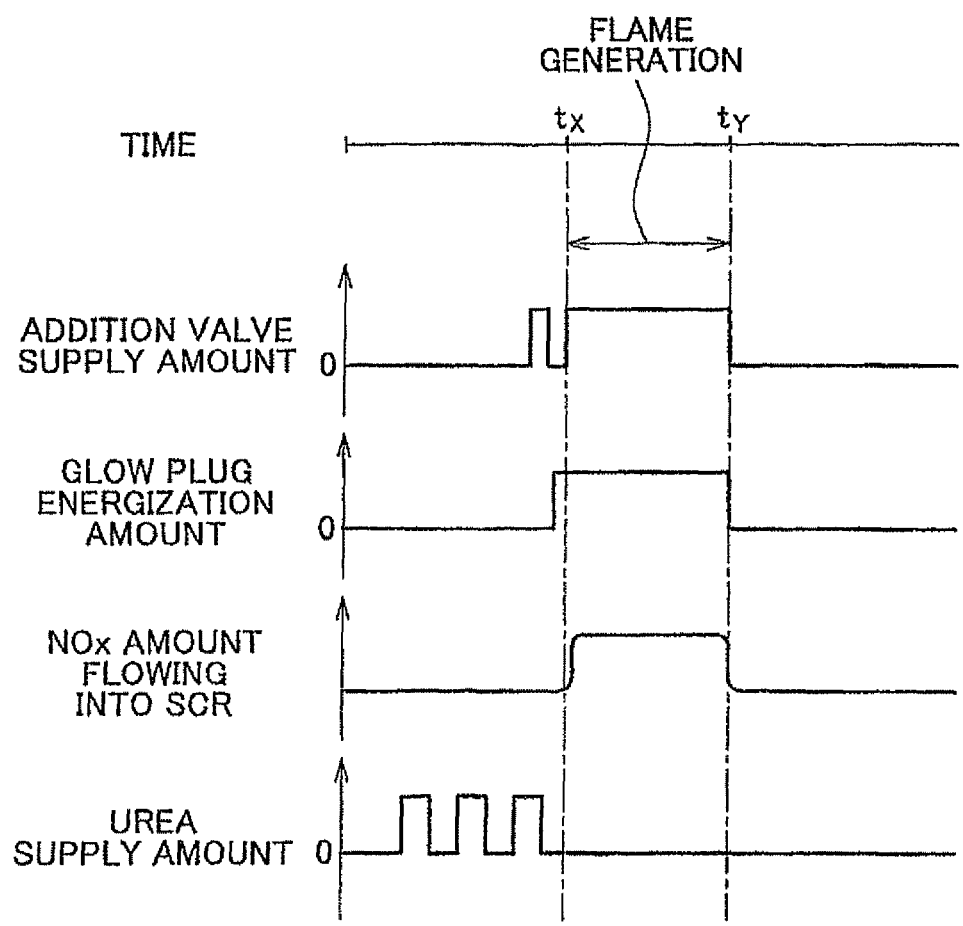
FIG. 20 is a time chart of a first operation control in Embodiment 4.
Figure 21:
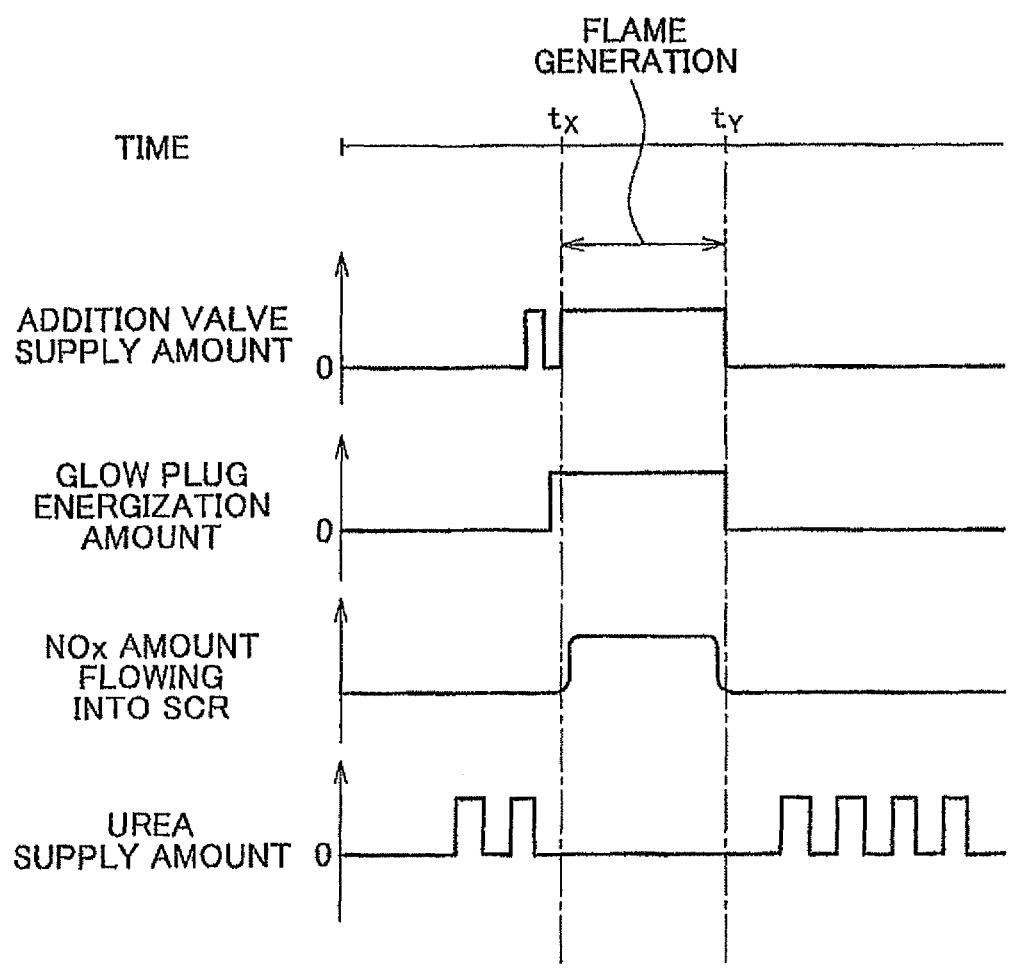
FIG. 21 is a time chart of a second operation control in Embodiment 4.

An explanation follows next on an exhaust purification device of an internal combustion engine according to Embodiment 4, with reference to FIGS. 19 to 21. The purification device of the internal combustion engine of the embodiment has an oxidation catalyst 13 disposed upstream, and a $NO_x$ selective reducing catalyst 58 disposed downstream. The exhaust purification device of the embodiment is formed in such a manner that $NO_x$ contained in the exhaust gas is treated in the $NO_x$ selective reducing catalyst 58.

FIG. 19 is a schematic diagram of the internal combustion engine of the embodiment. The exhaust purification device of the internal combustion engine of the embodiment has the oxidation catalyst 13, as the exhaust treatment device that is reached by flame, disposed downstream of the glow plug 51.

The $NO_x$ selective reducing catalyst 58 is disposed downstream of the oxidation catalyst 13. A temperature sensor 28 for detecting the temperature of the $NO_x$ selective reducing catalyst 58 is disposed downstream of the $NO_x$ selective reducing catalyst 58. A $NO_x$ sensor 59 is disposed downstream of the $NO_x$ selective reducing catalyst 58. The output signals of the temperature sensor 28 and the $NO_x$ sensor 59 are input to the input port 35 by way of corresponding AD converters 37 of the electronic control unit 30 (FIG. 1). A urea addition valve 53 for supplying urea into an exhaust passage is disposed upstream of the $NO_x$ selective reducing catalyst 58. The urea addition valve 53 functions as a reducing agent supply unit that supplies a reducing agent for $NO_x$ reduction to the $NO_x$ selective reducing catalyst 58.

The embodiment is identical to Embodiment 1 in that preliminary fuel is supplied, before flame generation, to cause unburned fuel to become adhered to the upstream end of the oxidation catalyst 13. In the exhaust purification device, flame reaches the upstream end of the oxidation catalyst 13 upon, for instance, rising of the temperature of the oxidation catalyst 13. Flame generation is accompanied by an increase in the amount of $NO_x$ in the exhaust gas. The increased $NO_x$ on account of flame generation is treated in the $NO_x$ selective reducing catalyst 58. The $NO_x$ selective reducing catalyst 58 reduces $NO_x$ into $N_2$.

FIG. 20 illustrates a time chart of a first operation control in the embodiment. In the embodiment, urea is supplied intermittently by the urea addition valve 53. Urea is supplied in the embodiment in such a way so as to make up for the ammonia consumed in the $NO_x$ selective reducing catalyst 58 during the flame generation period.

In the first operation control, the urea addition valve 53 supplies urea before the time $t_X$ of flame generation. Before flame generation, urea is supplied in such a manner that ammonia is adsorbed to the $NO_x$ selective reducing catalyst 58 in an amount equal to or greater than a predetermined amount. In the first operation control, the urea addition valve 53 supplies urea in an amount corresponding to the ammonia that is consumed by flame generation. The urea addition valve 53 supplies a predetermined amount of urea. The increased $NO_x$ due to flame generation can thus be sufficiently treated by causing ammonia to be adsorbed to the $NO_x$ selective reducing catalyst 58, in an amount equal to or greater than a predetermined amount, before flame generation.

FIG. 21 is a time chart of a second operation control in the embodiment. In the second operation control, urea is supplied once flame generation is over, in such a way so as to make up for the ammonia consumed in the period of flame generation. Flame is generated at time $t_X$, and flame generation ends at time $t_Y$. The supply amount of urea is increased in the embodiment from time $t_Y$ onwards. The amount of urea that is supplied, once flame generation is over, is greater than the amount of urea supplied before flame generation. In the embodiment a predetermined amount of urea is supplied both before flame generation and after flame generation.

The increased $NO_x$ is treated during flame generation. The adsorption amount of ammonia in the $NO_x$ selective reducing catalyst 58 is reduced as a result. In the second operation control, the amount of ammonia consumed during the period of flame generation can be replenished once flame generation is over. This allows replenishing, after flame generation, the adsorption of ammonia that is consumed for treating the increased $NO_x$ due to flame generation.

In the exhaust purification device of the embodiment, as illustrated in FIG. 19, the urea addition valve 53 is disposed downstream of the oxidation catalyst 13, in such a manner that that the urea supplied by the urea addition valve 53 dries not come into contact with the flame. Therefore, supply of urea is not limited to before flame generation or after flame generation, and urea may also be supplied during the flame generation period.

The exhaust purification device of the internal combustion engine may also have an adsorption amount detection unit that detects the amount of ammonia adsorbed onto the $NO_x$ selective reducing catalyst 58. The adsorption amount detection unit can calculate the adsorption, amount of ammonia at any time on the basis of, for instance, the temperature of the $NO_x$ selective reducing catalyst 58 as detected by the temperature sensor 28, the amount of urea supplied by the urea addition valve 53, and the amount of $NO_x$ flowing into the $NO_x$ selective reducing catalyst 58.

Providing an adsorption amount detection unit in the exhaust purification device allows detecting the amount of ammonia adsorbed to the $NO_x$ selective reducing catalyst 58, and makes for more accurate control. For instance, the amount of ammonia consumed during the period of flame generation is calculated, so that, after flame generation, there can be supplied an amount of urea that corresponds to the ammonia consumed during flame generation. Alternatively, a maximum value of the adsorption amount of the ammonia in the $NO_x$ selective reducing catalyst 58 may be set beforehand, and supply of urea is controlled to be discontinued when the adsorption amount of ammonia reaches that maximum.

There are instances where unburned fuel, having failed to be completely oxidized in the exhaust treatment device upstream of the $NO_x$ selective reducing catalyst 58, flows into the $NO_x$ selective reducing catalyst and becomes adhered thereto. Unburned fuel adhered to the $NO_x$ selective reducing catalyst 58 precludes ammonia from becoming adsorbed thereonto, and the $NO_x$ purification rate decreases, i.e. the $NO_x$ selective reducing catalyst 58 suffers so-called HC poisoning. The unburned fuel adhered to the $NO_x$ selective reducing catalyst 58 can be desorbed from the $NO_x$ selective reducing catalyst 58 by raising the temperature of the $NO_x$ selective reducing catalyst.

The exhaust purification device of the internal combustion engine of the embodiment has a poisoning detection unit that detects the HC poisoning amount in the $NO_x$ selective reducing catalyst 58. The poisoning detection unit of the embodiment has the $NO_x$ sensor 59 disposed downstream of the $NO_x$ selective reducing catalyst 58. HC poisoning of the $NO_x$ selective reducing catalyst 58 can be detected in that $NO_x$ sensor 59 detects the amount of $NO_x$ that flows out of the $NO_x$ selective reducing catalyst 58 without having being treated, under a predetermined operation state. For instance, the poisoning detection unit may be formed so as to detect the HC poisoning amount on the basis of an operation state history.

In a third operation control of the embodiment, HC poisoning recovery is performed when the HC poisoning amount detected by the HC poisoning detection unit is equal to or greater than a criterion value. In the third operation control, flame is generated by a flame generating unit. Flame generation causes the temperature of the oxidation catalyst 13 and the exhaust gas to rise. The rise in the temperature of the exhaust gas allows the temperature of the $NO_x$ selective reducing catalyst 58 to rise, and allows thereby the HC adhered to the $NO_x$ selective reducing catalyst 58 to desorb off from the $NO_x$ selective reducing catalyst 58.

Rising the temperature of the $NO_x$ selective reducing catalyst 58 to recover HC poisoning has the effect of making ammonia unlikelier to adsorb onto the $NO_x$ selective reducing catalyst 58. Also, a rise in the temperature of the $NO_x$ selective reducing catalyst 58 makes the adsorbed ammonia easier to be discharged in the form of ammonia or In the embodiment, the supply of urea that is supplied by the urea addition valve 53 is reduced during flame generation for HC poisoning recovery. The supply amount of urea is reduced below the amount that is supplied when the HC poisoning amount is smaller than a criterion value. However, urea goes on being supplied, since $NO_x$ still flows into the $NO_x$ selective reducing catalyst 58 also during HC poisoning recovery. Preferably, urea is supplied in the minimum necessary amount for treating the increased $NO_x$ due to flame generation.

The explanation of the embodiment deals with an instance in which the exhaust treatment device that is reached by flame has the oxidation catalyst 13. However, a particulate filter may also be used as the exhaust treatment device. In the case of a particulate filter, the temperature is raised to a temperature where particulate matter can burn, to raise thereby the temperature of the $NO_x$ selective reducing catalyst 58. The resulting combustion heat of the particulate matter can be exploited to raise the temperature of the $NO_x$ selective reducing catalyst 58.

Other features, effects and results are identical to those of any one of Embodiments 1 to 3, and a recurrent explanation thereof will be omitted.

The above embodiments can be appropriately combined with one another. In the drawings, identical or corresponding portions are denoted with the same reference numerals. The above embodiments are illustrative in character and do not limit the invention in any way. In addition, in the above embodiments, it is to be understood that "storage" used herein means retention of a substance (solid, liquid, gas molecules) in the form of at least one of adsorption, adhesion; absorption, trapping, occlusion, and others.

The invention claimed is:

1. An exhaust gas control device for an internal combustion engine, the exhaust gas control device comprising:
   an exhaust pipe;
   an exhaust passage that conveys exhaust gas, the exhaust passage including the exhaust pipe;
   an exhaust treatment device that purifies an exhaust gas, and that is disposed in the exhaust passage;
   a flame generator that supplies unburned fuel, generates a flame through ignition of the unburned fuel contained in the exhaust gas, and causes a generated flame to reach an upstream end of the exhaust treatment device, the flame generator being located in the exhaust pipe upstream of the exhaust treatment device in the exhaust passage; and
   an electronic control unit having control logic configured to cause the electronic control unit to control the flame generator to supply the unburned fuel so that the unburned fuel becomes adhered to the upstream end of the exhaust treatment device before the flame generated by the flame generator reaches the exhaust treatment device, and to cause the unburned fuel adhered to the upstream end of the exhaust treatment device to burn by the flame.

2. The exhaust gas control device according to claim 1, wherein
   the flame generator comprises a glow plug, and a fuel addition valve that supplies the unburned fuel into the exhaust passage upstream of the glow plug, and
   in order to cause the unburned fuel to become adhered to the upstream end of the exhaust treatment device, the electronic control unit is configured to cause the fuel addition valve to supply the unburned fuel before a temperature of the glow plug reaches an ignition temperature of the unburned fuel through energization of the glow plug.

3. The exhaust gas control device according to claim 1, wherein the flame generator comprises a glow plug, and a fuel addition valve that supplies the unburned fuel into the exhaust passage upstream of the glow plug, and in order to cause the unburned fuel to become adhered to the upstream end of the exhaust treatment device, the electronic control unit is configured to cause the fuel addition valve to supply the unburned fuel in an amount greater than a minimum amount required for generating the flame, after a temperature of the glow plug reaches an ignition temperature of the unburned fuel through energization of the glow plug.

4. The exhaust gas control device according to claim 1, wherein the electronic control unit is configured to generate the flame intermittently a plurality of times.

5. The exhaust gas control device according to claim 4, wherein the electronic control unit is configured to reduce an amount of the unburned fuel adhered to the exhaust treatment device upon any of a second and subsequent flame generations, from among the plurality of flame generations, with respect to the amount of the unburned fuel adhered to the exhaust treatment device upon a first flame generation.

6. The exhaust gas control device according to claim 4, wherein the electronic control unit is configured to prolong duration of any of a second and subsequent flame generations, from among the plurality of flame generations, with respect to duration of a first flame generation.

7. The exhaust gas control device according to claim 4, wherein the electronic control unit is configured to raise a temperature of the flame upon any of a second and subsequent flame generations, from among the plurality of flame generations, with respect to the temperature of the flame upon a first flame generation.

8. The exhaust gas control device according to claim 1, further comprising a first temperature sensor, wherein:

the exhaust treatment device comprises an oxidation catalyst that adsorbs the unburned fuel;

the first temperature sensor detects a temperature of the oxidation catalyst; and the electronic control unit is configured to reduce an adsorption amount of the unburned fuel as a detected temperature of the oxidation catalyst increases.

9. The exhaust gas control device according to claim 1, wherein:

the exhaust treatment device comprises an oxidation catalyst that adsorbs the unburned fuel; and the electronic control unit is configured to detect an amount of the unburned fuel adhered to the oxidation catalyst, and to lower a temperature of the flame as the amount of the unburned fuel adhered to the oxidation catalyst increases.

10. The exhaust gas control device according to claim 1, wherein:

the exhaust treatment device comprises a $NO_x$ storage catalyst;

when an air-fuel ratio of the exhaust gas flowing into the $NO_x$ storage catalyst is lean, the $NO_x$ storage catalyst stores $NO_x$ contained in the exhaust gas, and when the air-fuel ratio is a stoichiometric air-fuel ratio or a rich air-fuel ratio, the $NO_x$ storage catalyst releases the stored $NO_x$, and stores $SO_x$, along with the $NO_x$ upon storage of the $NO_x$;

when a temperature of the $NO_x$ storage catalyst rises to a temperature at which the $SO_x$ is released and when the air-fuel ratio becomes the stoichiometric air-fuel ratio or the rich air-fuel ratio, the $NO_x$ storage catalyst releases the stored $SO_x$; and the electronic control unit is configured to cause the flame generator to generate the flame, and to enrich the air-fuel ratio, when performing $NO_x$ release control for release of the $NO_x$ from the $NO_x$ storage catalyst or $SO_x$ release control for release of the $SO_x$ from the $NO_x$ storage catalyst.

11. The exhaust gas control device according to claim 10, wherein the electronic control unit is configured to intermittently enrich the air-fuel ratio when performing the $NO_x$ release control or the $SO_x$ release control.

12. The exhaust gas control device according to claim 10, wherein the electronic control unit is configured to increase oxygen concentration in the exhaust gas that is supplied to the flame generator, before generation of the flame or during a period in which the flame is generated, when performing the $NO_x$ release control or the $SO_x$ release control.

13. The exhaust gas control device according to claim 10, wherein the electronic control unit is configured to reduce oxygen concentration in the exhaust gas that is supplied to the flame generator, before generation of the flame or during a period in which the flame is generated, when performing the $NO_x$ release control or the $SO_x$ release control.

14. The exhaust gas control device according to claim 10, wherein the electronic control unit is configured to reduce a flow rate of the exhaust gas, during a period in which the flame is generated or after generation of the flame, when performing the $NO_x$ release control or the $SO_x$ release control.

15. The exhaust gas control device according to claim 10, wherein the electronic control unit is configured to increase an amount of the unburned fuel that is supplied by the fuel addition valve during a period in which the flame is generated.

16. The exhaust gas control device according to claim 10, wherein the electronic control unit is configured to detect an amount of an active substance that is generated by the flame, and increase a number of times in which the flame is generated, when the amount of the active substance detected by the electronic control unit is equal to or less than a criterion value, as compared with the number of times when the amount of the active substance detected by the electronic control unit is greater than the criterion value.

17. The exhaust gas control device according to claim 10, wherein the electronic control unit is configured to make the air-fuel ratio leaner and increase a flow rate of the exhaust gas after the $NO_x$ release control or the $SO_x$ release control, as compared with the air-fuel ratio and the flow rate of the exhaust gas when the $NO_x$ release control or the $SO_x$ release control is executed.

18. The exhaust gas control device according to claim 10, wherein the $NO_x$ storage catalyst has an active $SO_x$ release temperature at which the $SO_x$ is released by an active substance when the flame reaches the $NO_x$ storage catalyst, and the electronic control unit is configured to, during the $NO_x$ release control, raise a temperature at an upstream end of the $NO_x$ storage catalyst to the temperature equal to or higher than the active $SO_x$ release temperature.

19. The exhaust gas control device according to claim 10, wherein the exhaust treatment device comprises a $SO_x$ adsorption catalyst that traps the $SO_x$, and the $SO_x$ adsorption catalyst is disposed downstream of the $NO_x$ storage catalyst in the exhaust passage.

20. The exhaust gas control device according to claim 19, further comprising a second temperature sensor that detects a temperature of the $SO_x$ adsorption catalyst, wherein
the electronic control unit is configured to restrict generation of the flame when a detected temperature of the $SO_x$ adsorption catalyst is lower than a criterion value.

21. The exhaust gas control device according to claim 1, further comprising a reducing agent injector that supplies urea or ammonia to the exhaust passage; wherein
the exhaust treatment device comprises an oxidation catalyst, and a $NO_x$ selective reducing catalyst that is disposed downstream of the oxidation catalyst and that selectively reduces $NO_x$ contained in the exhaust gas by means of the ammonia;
the reducing agent injector is disposed upstream of the $NO_x$ selective reducing catalyst; and
the electronic control unit is configured to replenish the ammonia that is adsorbed to the $NO_x$ selective reducing catalyst and that is consumed during a period in which the flame is generated, by causing the reducing agent injector to supply the urea or the ammonia.

22. The exhaust gas control device according to claim 21, wherein the electronic control unit is configured to cause the reducing agent injector to supply the urea or the ammonia such that an amount of the ammonia adsorbed to the $NO_x$ selective reducing catalyst becomes equal to or greater than a predetermined amount, before generation of the flame or after the generation of the flame.

23. The exhaust gas control device according to claim 21, further comprising a poisoning detector that detects a HC poisoning amount of the $NO_x$ selective reducing catalyst, wherein
the electronic control unit is configured to cause the flame generator to generate the flame when the HC poisoning amount detected by the poisoning detector is equal to or greater than a criterion value.

24. The exhaust gas control device according to claim 1, wherein
the exhaust treatment device comprises a particulate filter that traps particulate matter in the exhaust gas; and
the electronic control unit is configured to generate the flame upon removal of the particulate matter from the particulate filter through burning of the particulate matter by raising a temperature of the exhaust gas.

25. The exhaust gas control device according to claim 1, further comprising:
a reducing agent injector that supplies urea to a $NO_x$ selective reducing catalyst; and
a poisoning detector that detects a HC poisoning amount of the $NO_x$ selective reducing catalyst, wherein
the exhaust treatment device comprises an oxidation catalyst or a particulate filter that traps particulate matter in the exhaust gas, and the $NO_x$ selective reducing catalyst that is disposed downstream of the particulate filter or of the oxidation catalyst and that selectively reduces $NO_x$ contained in the exhaust gas by means of ammonia generated from the urea; and
the electronic control unit is configured to generate the flame when the HC poisoning amount detected by the poisoning detector is equal to or greater than a criterion value, and to cause the reducing agent injector to supply the urea in a smaller supply amount than when the HC poisoning amount is smaller than the criterion value.

26. The exhaust gas control device according to claim 1, further comprising a flame state detector that detects whether the flame is generated or not, wherein
the electronic control unit executes flame generation control when the flame is generated and flame non-generation control when the flame is not generated, and
the electronic control unit is configured to select either of the flame generation control and the flame non-generation control on the basis of a determination, by the flame state detector, of whether the flame is generated or not.

27. The exhaust gas control device according to claim 1, wherein the electronic control unit is configured to detect an amount of soot deposited on at least one of the flame generator and the exhaust treatment device and generate the flame when a soot deposition amount detected by the electronic control unit exceeds an allowable value.

* * * * *